United States Patent [19]

Eckerman et al.

[11] Patent Number: 5,504,571
[45] Date of Patent: Apr. 2, 1996

[54] RUN-OUT VELOCITY ACCELERATION TESTER WITH DIRECT VELOCITY MEASUREMENT

[75] Inventors: Jim Eckerman, Boulder Creek; Ian Freeman, Fremont; Richard N. Hunt, Los Gatos, all of Calif.

[73] Assignee: Thot Technologies, Campbell, Calif.

[21] Appl. No.: 78,969

[22] Filed: Jun. 17, 1993

[51] Int. Cl.$^6$ .................. G01P 3/36; G11B 3/90
[52] U.S. Cl. .................. 356/28.5; 369/53
[58] Field of Search .................. 356/28.5; 369/53

[56] References Cited

U.S. PATENT DOCUMENTS

| | | | |
|---|---|---|---|
| 3,419,330 | 12/1968 | Schneider | 356/28.5 |
| 3,604,804 | 9/1971 | Penney et al. | 356/28.5 |
| 3,687,517 | 8/1972 | Brun | 356/28.5 |
| 4,551,017 | 11/1985 | Mannaua et al. | 356/28.5 |
| 4,551,018 | 11/1985 | Mannaua et al. | 356/28.5 |
| 4,879,672 | 11/1989 | Pombrio | 364/566 |
| 5,159,406 | 10/1992 | Adler et al. | 356/28.5 |
| 5,247,448 | 9/1993 | Liu | 364/468 |
| 5,253,531 | 10/1993 | Walker et al. | 73/650 |

FOREIGN PATENT DOCUMENTS 0095371   4/1988   Japan .................. 356/28.5

*Primary Examiner*—Stephen C. Buczinski
*Attorney, Agent, or Firm*—James E. Eakin; James D. Ivey

[57] ABSTRACT

A Runout, Velocity, Acceleration includes direct measurement of velocity by use of a Doppler laser, and determines runout by integration of the velocity information while determining acceleration by differentiating the velocity information, with appropriate correction for sources of error. A menu driven system permits the user to select from a variety of options for testing of rotating objects and manipulation, storage and display of the data. A novel windowing technique permits the display of multiple child windows, each having its own set of pull down menus for use in connection with that child window.

6 Claims, 20 Drawing Sheets

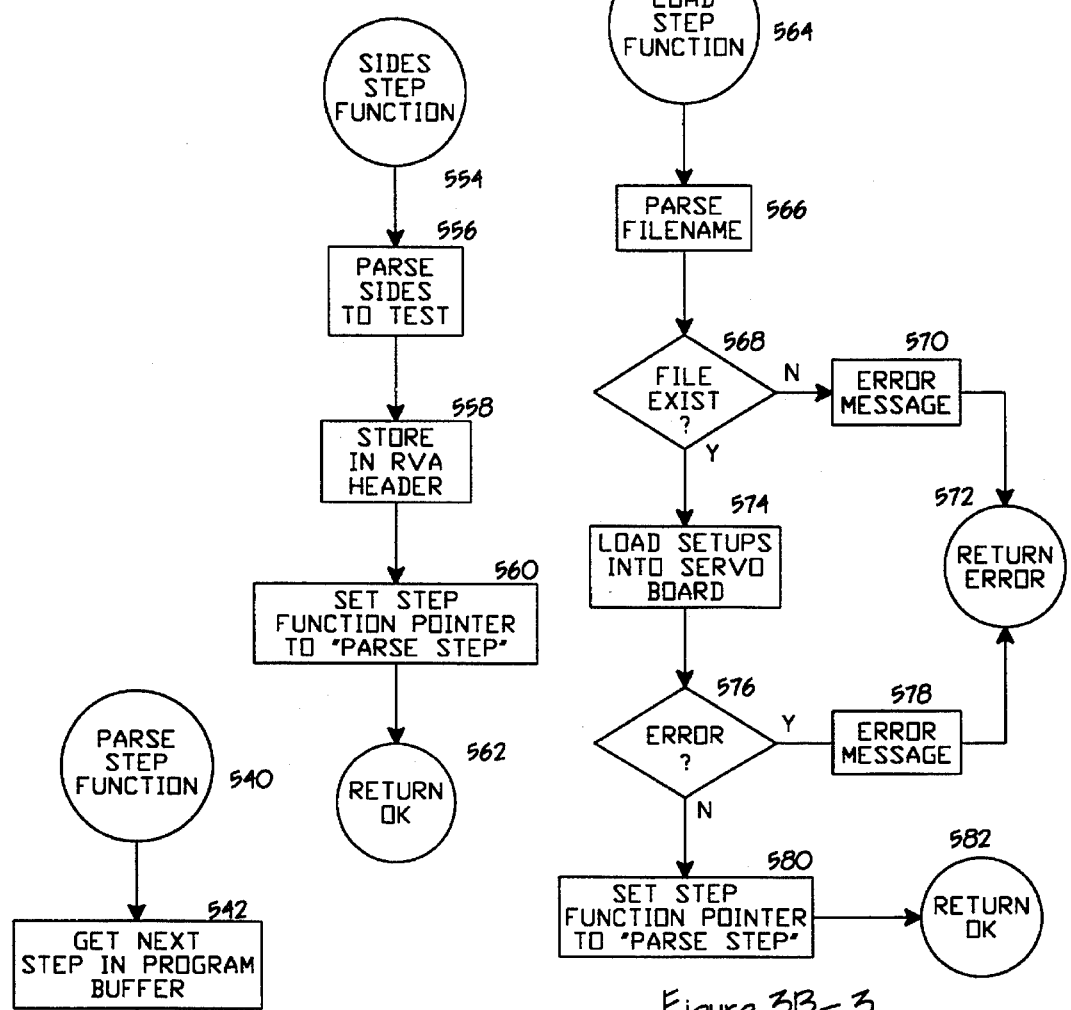
Figure 3B-2
Figure 3B-3
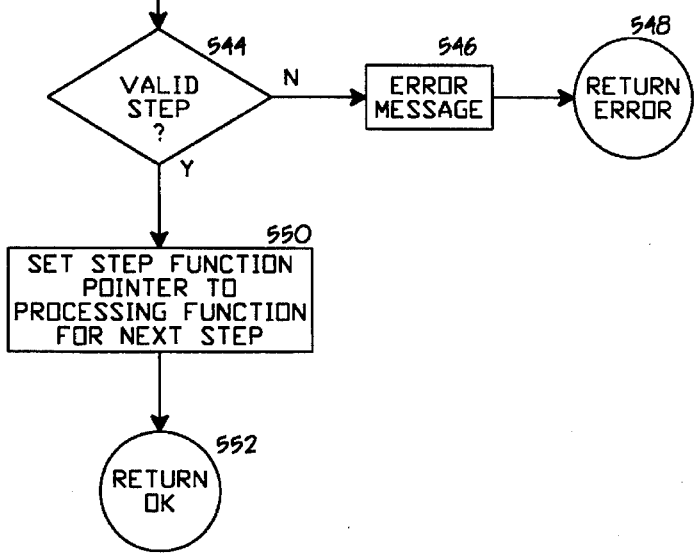
Figure 3B-1

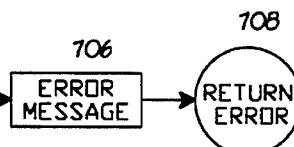
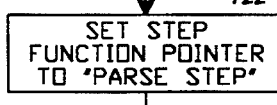

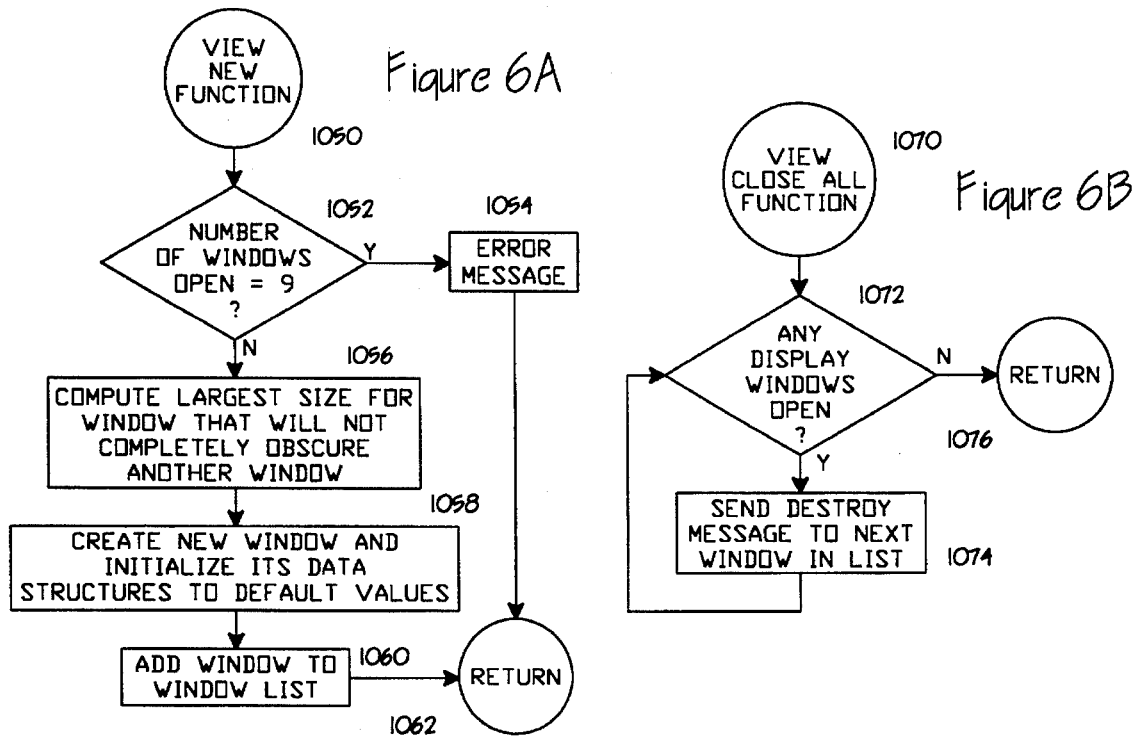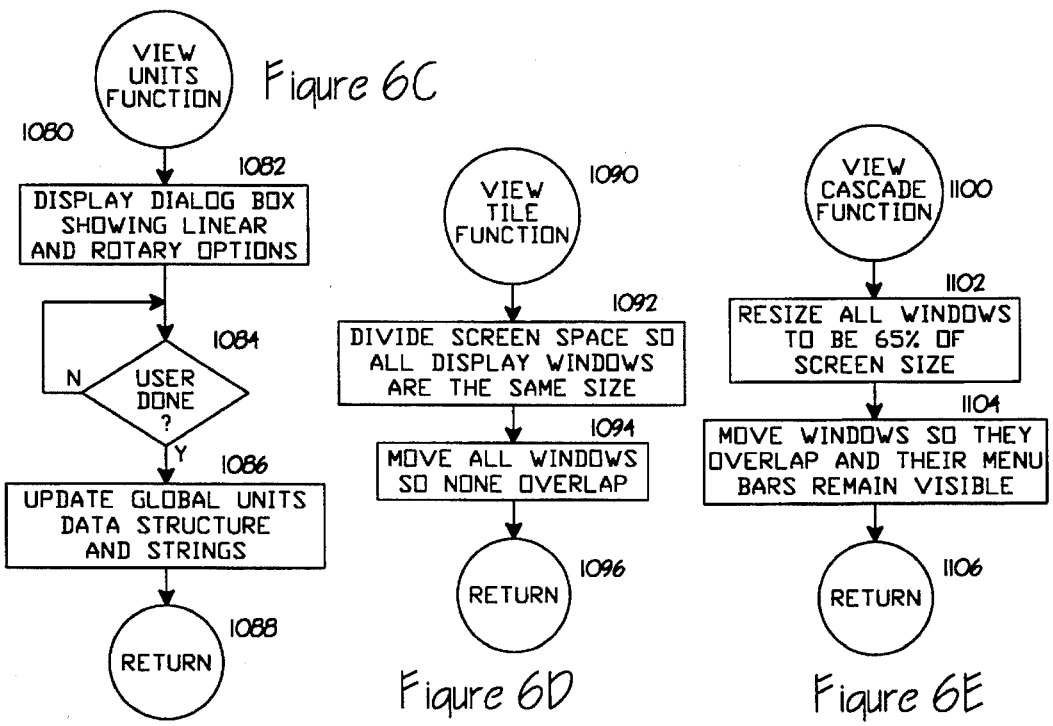

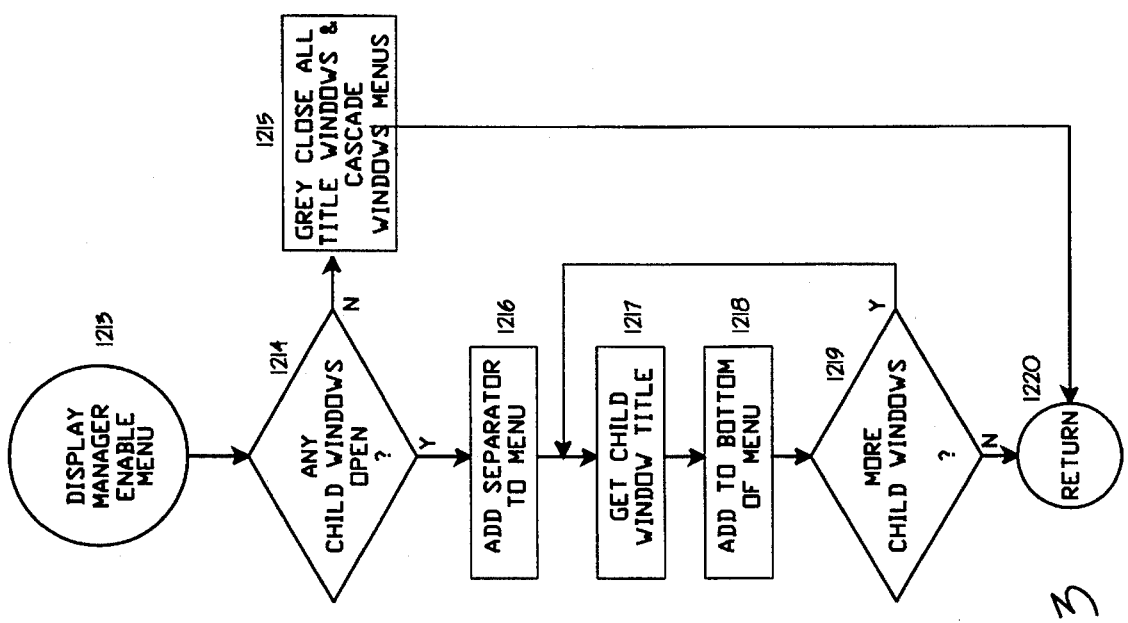
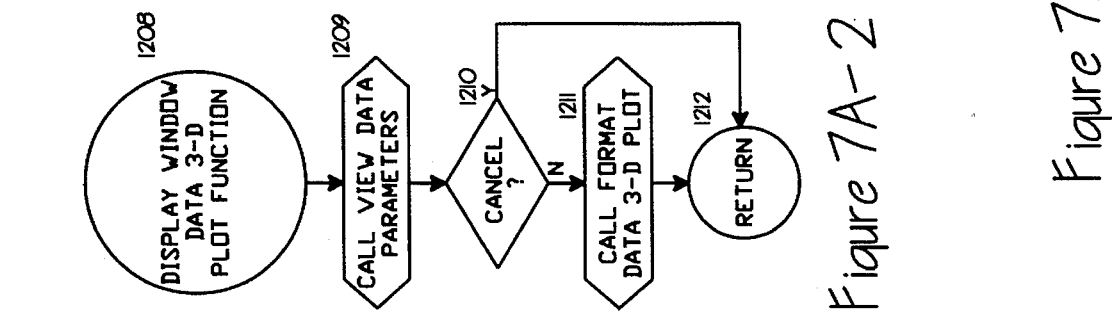
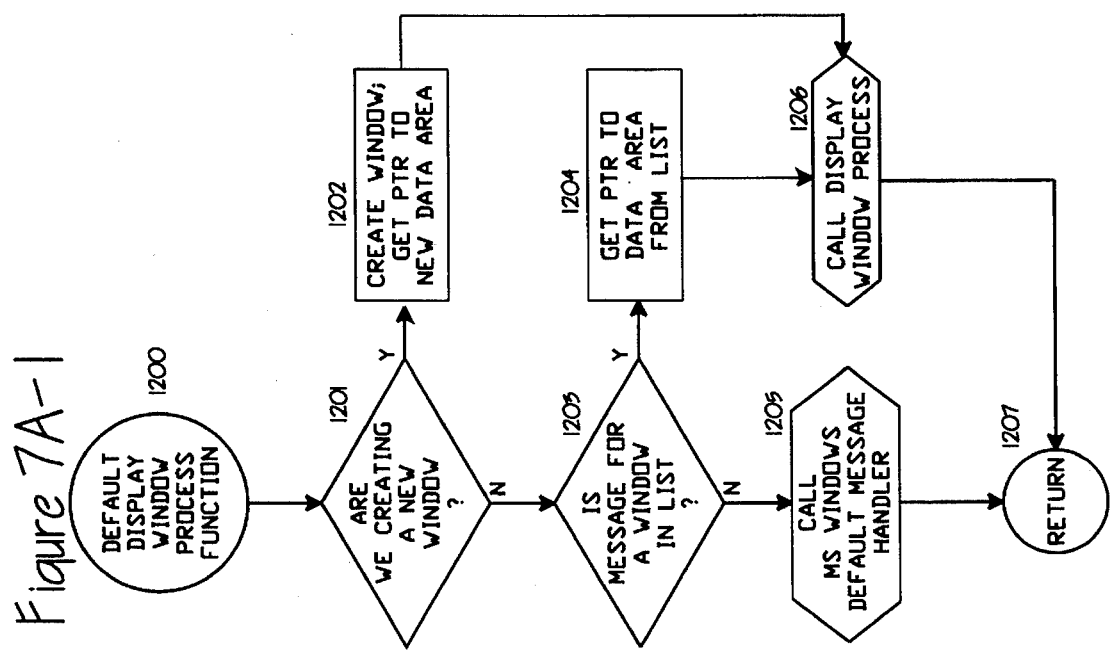
Figure 7A-1
Figure 7A-2
Figure 7A-3

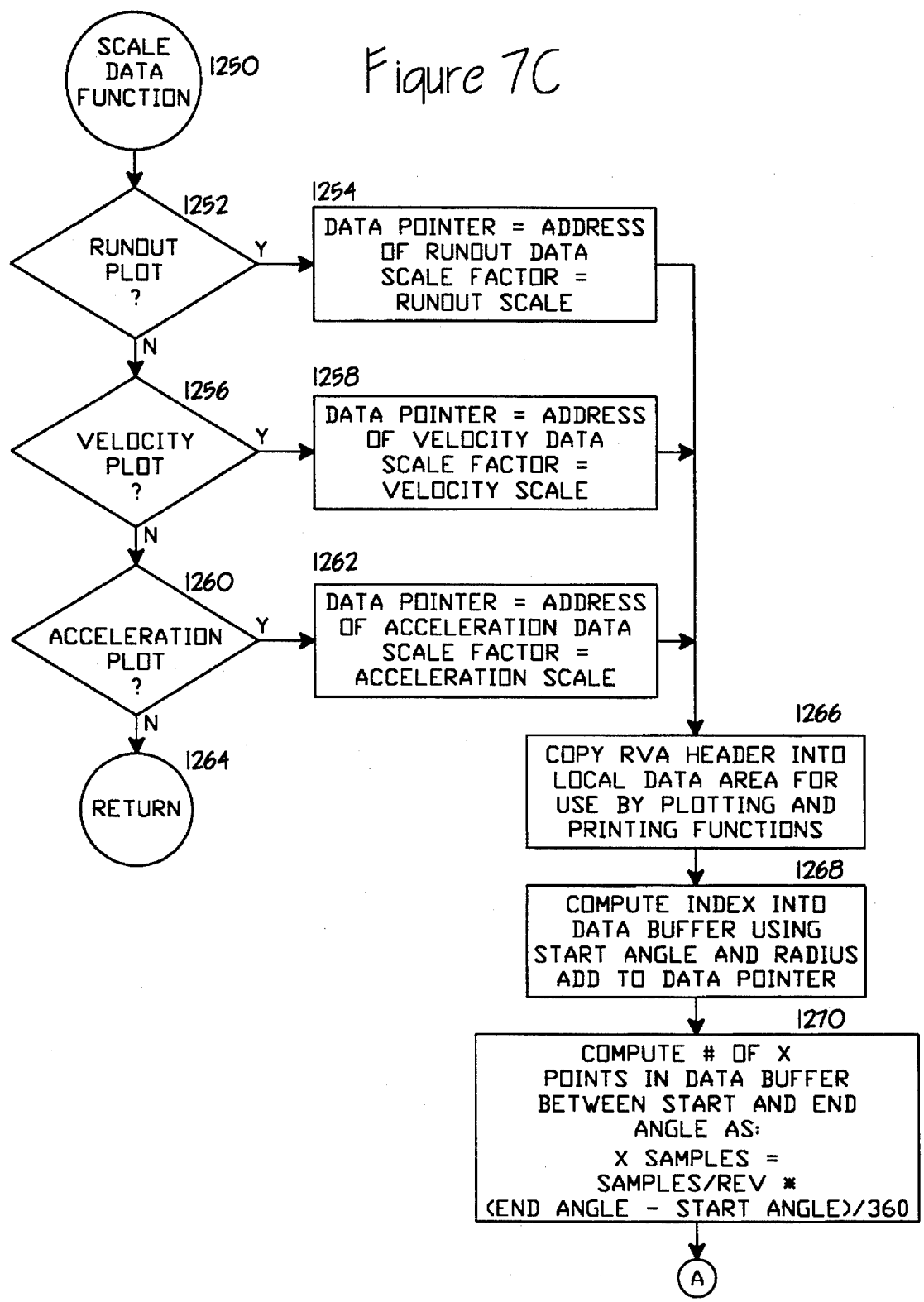

RUN-OUT VELOCITY ACCELERATION TESTER WITH DIRECT VELOCITY MEASUREMENT

FIELD OF THE INVENTION

This application relates to devices for measuring disk flatness, and particularly for measuring microflatness in devices requiring extremely low tolerances, such as disk media for fixed disk drives or similar applications.

BACKGROUND OF THE INVENTION

One of the critical aspects of fixed disk drives and other applications involving the motion of a rotating object relative to a reference plane is the requirement that the disk or object itself be flat within very close tolerances. In the disk drive environment, if the disk(s) are not suitably flat, the data may not be recorded accurately on the disk, or the heads may crash into the disk. Similar errors can result for other types of rotating objects.

In fixed disk drives, the read/write errors which can occur because a disk is not suitably flat are caused by the aerodynamics of the head/disk assembly. In an ideal disk, the heads (which are mounted on lightweight springs) follow the contour of a rotating disk at a substantially uniform flying height. However, if the disk has a sudden variation in flatness, the springs to which one of the heads is mounted may not be able to react quickly enough to allow that head to follow the contour. More specifically, if the disk exhibits a sudden dip such that the head is unable to follow, the gap between the disk and the head increases. If the gap becomes too large, the head cannot accurately write to or read from the disk, and data errors occur.

Conversely, if the disk exhibits a rise which occurs too suddenly for the head to follow, the head may crash into the disk. While such head crashes are not in all instances fatal, they can damage both the disk and the heads, and eventually are likely to contribute to failure of the drive. It has thus been desirable to provide a disk which is as close to perfectly flat as possible.

To measure the flatness of a rotating disk has historically involved measurement of runout (or distance), velocity and acceleration for the disk. Devices which provide such measurements in at least the disk drive field are referred to as RVA testers. In rigid disk and disk drive manufacturing, the two important reference directions are the axial (parallel to the long axis of the spindle motor and perpendicular to the plane of rotation of the disk) and the radial (perpendicular to the long axis of the motor and in the plane of rotation of the disk) directions.

Numerous RVA testers are known in the prior art. For example, ProQuip offers commercially a Model SU-5800 device for testing the flatness of fixed disk media. Other similar types of devices are manufactured by Lion Precision (the DMT Series) and ADE Corporation (Microsense 2000).

The theoretical calculations for runout, velocity and acceleration are well known from Newtonian mechanics. In particular, $$s = ut + \tfrac{1}{2} at^2 \quad (1)$$

$$v = u + at \quad (2)$$

$$a = a \quad (3)$$

Likewise from Newtonian mechanics, it is known that velocity can be determined from a measurement of distance by differentiating distance over time. Similarly, acceleration can be determined by differentiating velocity over time. Most, if not all, prior art devices have measured distance, and double differentiated for acceleration measurements.

Unfortunately, a significant difficulty arises with respect to devices which rely on differentiation for the velocity and double differentiation for the acceleration measurements. A single numerical differentiation tends to exacerbate any random error in the measured signals, and a double differentiation greatly exacerbates such errors. The result is that devices which use such measurement techniques are inherently inaccurate. Such inaccuracies have been accepted in the past because no alternatives were readily available. However, there has been a long felt need for an RVA tester which substantially improves upon the accuracy of the prior art.

SUMMARY OF THE INVENTION

The present invention overcomes, at least to a very substantial extent, the limitations of the prior art. In particular, the system and methodology of the present RVA test, which is particularly suited to disk drives but could also be readily adapted for more general use, employs a Doppler laser to directly determine instantaneous velocity. In oversimplified terms, the use of a laser vibrometer, which includes a laser light source, permits the disk under test to be illuminated with a laser, A portion of the reflected beam is measured, and the Doppler phase difference is determined between the illuminating beam and a portion of the reflected beam. For a uniformly flat disk or other object, there is no change in phase. However, if a deformation, including deformations as small as pits and asperities, exists on the disk, the phase difference will change accordingly, reflecting changes from the nominal velocity. By taking a suitable large number of samples, an image of the entire disk can be obtained.

The velocity information is then integrated to provide a measure of runout, and differentiated to provide acceleration. The result is a significant decrease in the "noise like" errors for both derived acceleration and displacement.

The derivation of displacement also requires additional information, in particular the constant of integration. However, offset and drift, which will be included in the velocity measurements, are not constant but instead may vary with time and temperature. Even though small, such non-zero offsets in the velocity data will be integrated and cause a systematic drift in the calculated displacement. This has, in the past, presented problems for at least some experiments. In the present invention, however, a correction factor is determined such that displacement calculations are performed accurately.

In addition, the system and method of the present invention permits the examination of pits and asperities in the surface under examination. Once the derformation information is manipulated, it is possible to provide a topographic image of the surface under test, showing both general deformation such as warping, and also smaller deformities.

The hardware portion of the present invention comprises off-the-shelf products, although in some cases slight modifications are required. In general, the system comprises a suitable microcomputer such as a system based on an Intel™80486 processor (or equivalent) having a suitable graphics engine such as a VESA LocalBus™ video board, appropriate serial and parallel ports, a suitably sized hard disk (at least 120 MB in a presently preferred embodiment), a mouse or other suitable cursor pointing device, and a high resolution graphics display, such as a video monitor capable of displaying SVGA or better. Other standard components are required but not mentioned here for the sake of brevity. In addition, the system includes a PC-compatible stepper indexer to permit programmable sequences to be loaded and executed for controlling carriage motor direction, acceleration, maximum speed, deceleration and total distance. In addition, a high speed IBM PC compatible data acquisition board is used for multichannel data acquisition, as well as a digital input/output card. Further, a servo motor control card is included as part of the system to permit programmable values for spindle motor direction, acceleration, deceleration and speed. The card preferably also provides programmable servo gain and filter values for optimizing performance. To provide hard copy output, a printer (either color or monochrome) is preferably provided.

External to the PC are also provided several additional components responsive to commands from the PC. Among these are a micro-stepper driver capable of operating a nominal 200 step per revolution stepper motor at up to 50,000 steps per revolution, together with a matching stepper motor for the air bearing carriage slide which is supported by miniature air jets that hold the slide away from the guiding rails, and travel and home position sensors for the slide to limit total carriage travel and establish a home reference point.

In addition, a high performance rotary air bearing spindle with extremely low runout and vibration is combined with a three phase brushless DC spindle motor such as a "kit" motor with windings and magnet stack mounted directly on the air bearing spindle. Position sensors also are provided, mounted in the spindle motor to detect rotation and provide commutation feedback. Further, a rotary position spindle encoder with two channel quadrature output and once around index signal is provided.

A laser vibrometer module, including a helium neon laser tube, beam splitters, Bragg cell, modulators and demodulators is coupled with a laser control system whereby the laser control electronics allow range setting and provide control electronics for Doppler shift velocity detection. A fiberoptic cable is also provided to deliver the laser signal to and from the sample under test, with a focusing lens also being provided. Finally, a servo driver, such as a three phase linear sine wave transconductance amplifier, and steering logic are provided. The steering logic may generally be thought of as the necessary logic to interface the various signals generated by the remaining logic, and also serves to generate timing signals.

It will be apparent to those skilled in the art that the disk under test is placed on the spindle and rotated under the control of the PC. The laser beam is positioned by the carriage and directed toward the selected surface of the disk and velocity measurements are taken which are then captured by the data acquisition board in the PC. The data is then manipulated by the PC in accordance with the data processing aspects of the present invention.

Manipulation of the data involves integration of the velocity data to yield runout, and differentiation of the velocity data to provide acceleration. The integration to obtain runout data provides a "smoothing" which reduces the noise-like errors normally caused by prior art devices. The single differentiation also avoids the introduction of errors typically caused by the double differentiation technique used by prior art devices.

In addition, the user is permitted to display the data in any of a number of ways, primarily through the use of a plurality of display windows. In a presently preferred embodiment, the program operates within the Windows™ environment although windowing operating systems are also acceptable. To overcome a limitation of the MDI Window Manager in Windows™ whereby multiple windows can be created but cannot have separate pull down menus, the present invention includes a method for providing pull down menus in each of a user-selectable number of windows up to a preset maximum.

It is therefore one object of the present invention to provide an RVA tester having substantially greater accuracy than prior art RVA testers.

It is a further object of the present invention to provide an RVA tester using direct measurement of velocity.

A still further object of the present invention is to provide an RVA tester which does not use double differentiation to determine acceleration.

Yet another object of the present invention is to provide an RVA tester which directly measures velocity, determines runout data by integration and determines acceleration by differentiation.

A still further object of the present invention is to provide an RVA tester which uses a Doppler laser to determine velocity information.

It is also an object of the present invention to provide a windowing display which permits multiple child windows each to have pull down menus operating within a window manager which expects only a main window to have pull down menus.

These and other objects of the present invention may be better appreciated from the following Detailed Description of the Invention taken in conjunction with the attached Figures.

THE FIGURES

FIGS. 3A–3F show in flow diagram form the Sequencer Process of the present invention, including the various functions which form part of the process.

FIGS. 4A-1 through 4D-2 show in flow diagram form the Data Acquisition Process of the present invention.

FIGS. 6A–6E show in flow diagram form the Display Manager Process of the present invention.

FIGS. 7A-1 through 7F show in flow diagram form the Data Display Window Process of the present invention.

DETAILED DESCRIPTION OF THE INVENTION

Figure 1:
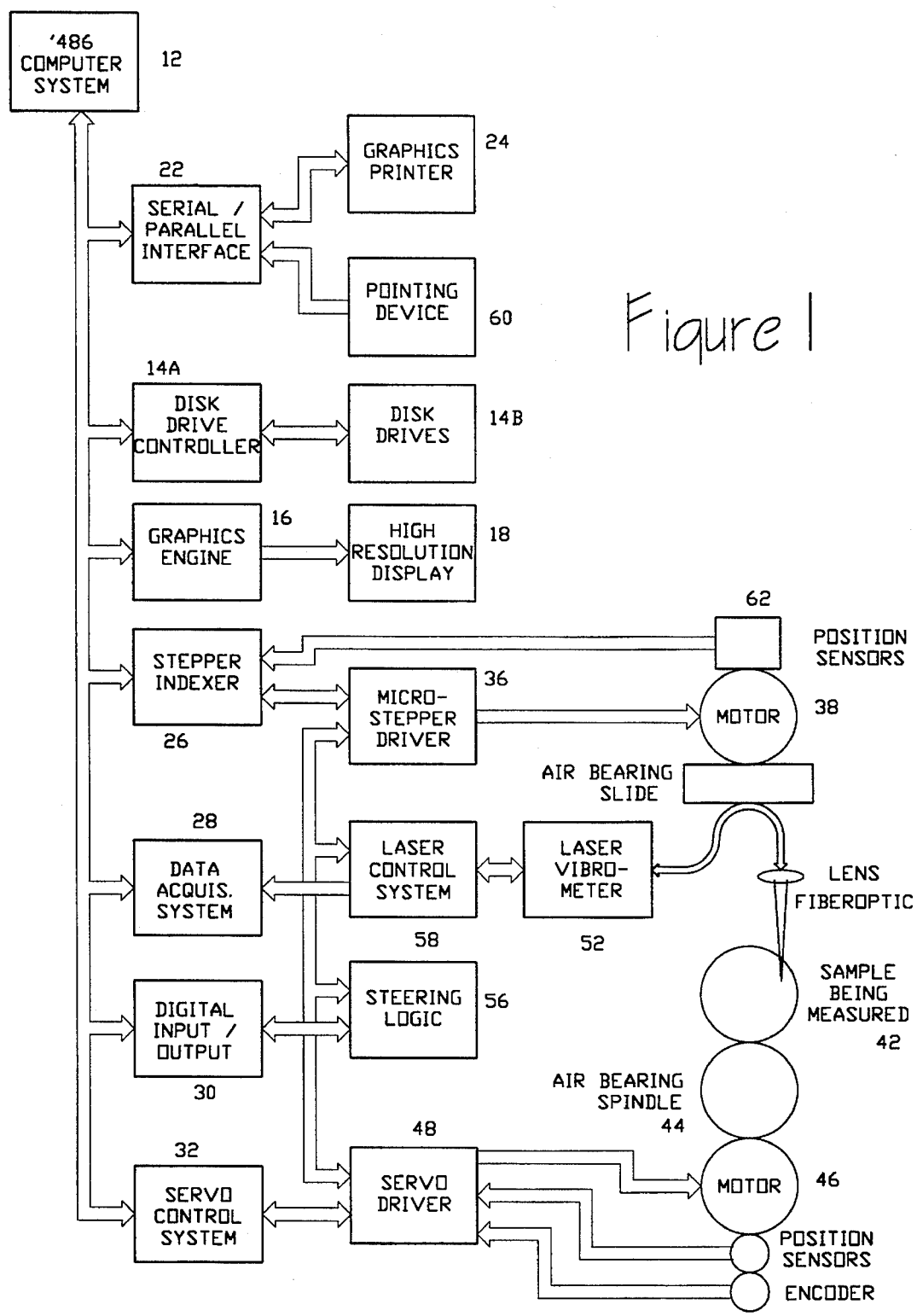
FIG. 1 shows in block diagram form the hardware portion of the system of the present invention.

Referring first to FIG. 1, the hardware components of the system of the present invention may be better understood. A suitable computer, indicated generally at 10, includes a system board 12 which may, for example, be based on an Intel 80486 microprocessor or other similar processor. The computer 10 includes a mass storage device 14, such as a fixed disk and suitable interface adapter, and a graphics engine 16. The graphics engine 16, which is preferably a high performance video display driver, is preferably a "local bus" video card or equivalent if the processor is a '486 or similar. The graphics engine 16 provides a video output to a video display device 18 with performance matched to the graphics engine. A keyboard 20 provides input for the computer 10, and a serial/parallel or similar output card 22 provides communication with a printer 24. The printer 24 is preferably capable of relatively high resolution graphics printing, such as at least 300 dpi. It will be appreciated by those of ordinary skill in the art that the elements 12 through 24 comprise a conventional IBM-compatible personal computer.

In addition, the computer 10 includes a stepper indexer 26, such as a Compumotor PC-21, together with a data acquisition board 28 such as a National Instruments AT-16-MIO-F5. Also included within the computer is a digital I/O card 30 and a servo motor control 32. The digital I/O card 30 may, for example, be a National Instruments AT-DIO-24, and the servo motor control 32 may be a Creonics MCC-IBM-PC-G00. For a personal computer based on an IBM compatible design, the components 26 to 32 are preferably internal to a chassis or case 34 indicated by the dashed line in FIG. 1. However, in many instances it will be possible to provide these same functions with externally mounted subsystems, and such external connection may be required for systems based on other processors.

As will be appreciated in greater detail hereinafter, the components 26 through 32 assist in providing the special functions required for the present invention. In turn, these components interact with other elements external to the case 34. In particular, the stepper indexer 26 provides control signals to a micro stepper driver 36 such as a Precision Motion Control LN-60, which actuates a stepper motor 38. The stepper motor 38, which may for example be a Superior Motor Frame 28, in turn moves an air bearing slide 40 such as an Air Bearing Technology ABT-LAS-4-.200 for examination of a sample under test, shown generically at 42.

The sample 42 is supported on a high performance rotary air bearing spindle 44 having extremely low runout and vibration, such as an Air Bearing Technology ABT-SP-3.0-K064.5–512, and is rotated by a spindle motor 46 such as a three phase brushless DC motor, for example a "kit" motor having windings and with its magnet stack mounted directly on the shaft of the air bearing spindle 44. The spindle motor 46 is typically controlled by a servo driver subsystem 48, operating under the control of the servo motor controller 32 in the case 34. The servo motor controller 32 allows programmable values for motor direction, acceleration, deceleration and speed, and provides programmable servo gain and filter values for optimizing performance with a variety of loads. The servo driver 48 is typically a three phase linear sine wave transconductance amplifier, such as an Inland Motor BLMS-06001-C. A spindle encoder 50, mounted on the spindle motor shaft, is typically a rotary position encoder with two channel quadrature output and once around index signal.

The velocity data which is fundamental to the present invention is acquired by use of a laser vibrometer 52, which includes a laser module with HeNe laser tube, beam splitters, Bragg cell, modulators and demodulators. The laser beam is conveyed to the sample 42 by means of a fiber optic cable 54, which also provides a means for routing back the return signal to the vibrometer 52. By directing the laser beam from the vibrometer 52 at the rotating disk of the sample 42, and measuring the phase difference of the return beam (the Doppler effect), the velocity of the rotating disk can be determined and provided to the data acquisition board 28. Also provided as part of the hardware is steering logic 56, which simply provides the interface for the various signals among the remaining components, and also provides inverting logic where necessary, and to generate appropriate timing signals.

Figure 2:
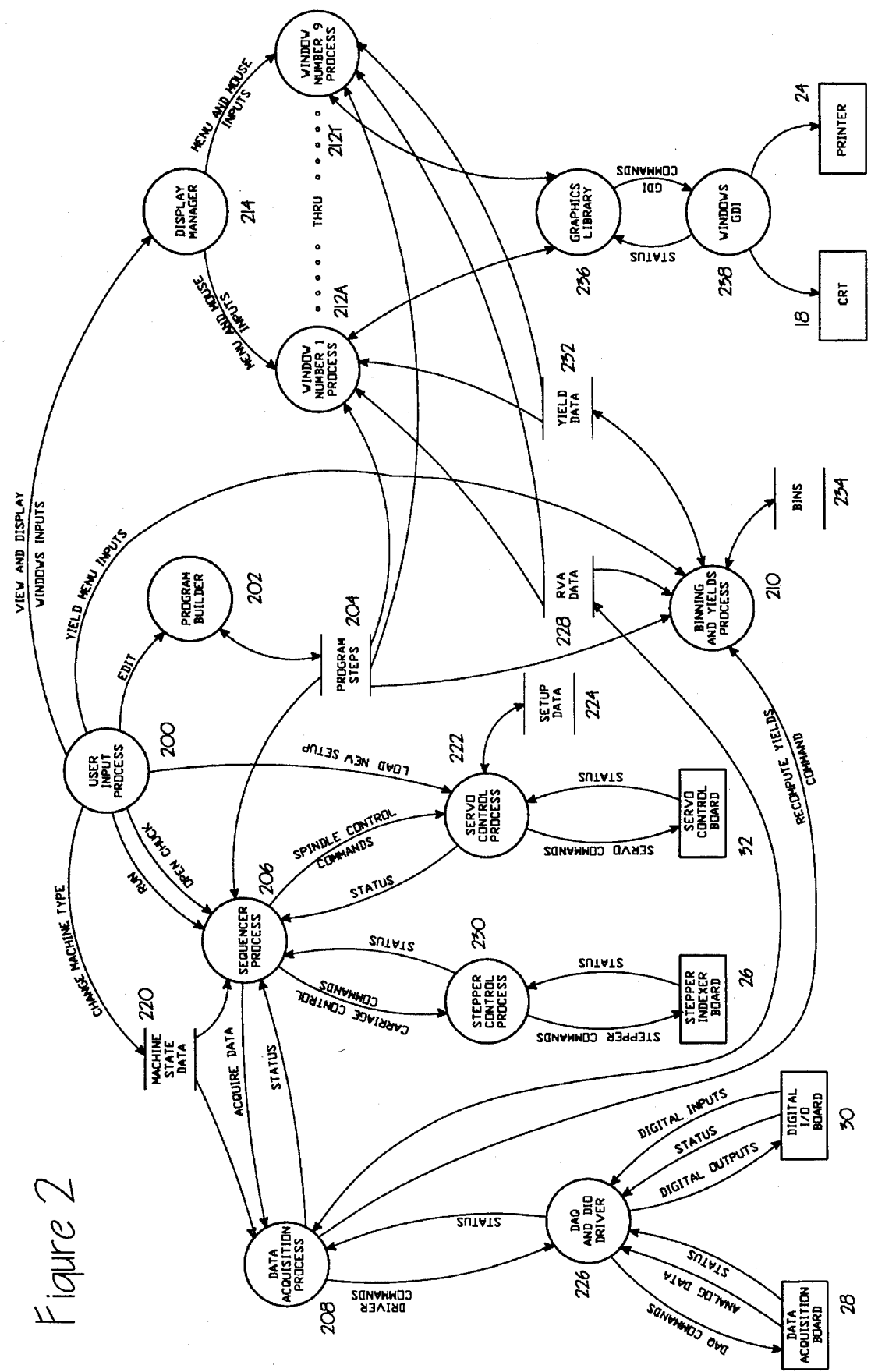
FIG. 2 shows in generalized flow diagram form the interaction between the hardware and software portions of the present invention.

Referring to FIG. 2, the interaction of the software of the present invention with the hardware described in connection with FIG. 1 may be better understood. FIG. 2 reflects the flow of data, including the user's menu selections, among the various modules of the system. The software aspects of the system of the present invention consists of seven major modules. The are:

1. User Input Process

When the user selects a menu or other mouse function or enters data through the keyboard, the User Input Process 200 parses them and directs them to the proper module, shown in FIG. 2.

2. Program Builder

A Program Builder Process 202 allows the user to create test Programs 204 that automate the process of RVA data collection. The process 202 reads and writes programs 204 to the mass storage 14 as well as creating dialogue boxes that ease parameter selection.

3. Sequencer Process

A Sequencer Process 206 executes the Programs created by the Program Builder Process 202. When the Sequencer Process 206 is activated, such as by a user selecting "RUN" from the User Input Process 200, the steps of the Programs 204 created by the Program Builder 202 are processed in order and error checking is performed. When the process 206 has completed, it is deactivated. This process is described in greater detail in connection with FIGS. 3A–3F.

4. Data Acquisition Process

When the Sequencer Process 206 encounters steps that require data collection, they are routed to a Data Acquisition Process 208. Through the Data Acquisition Process 208, data is collected, processed, and saved to disk 14 in the manner specified by the Program 204. This process is described in greater detail in connection with FIG. 4.

5. Binning And Yields Process

Figure 5:
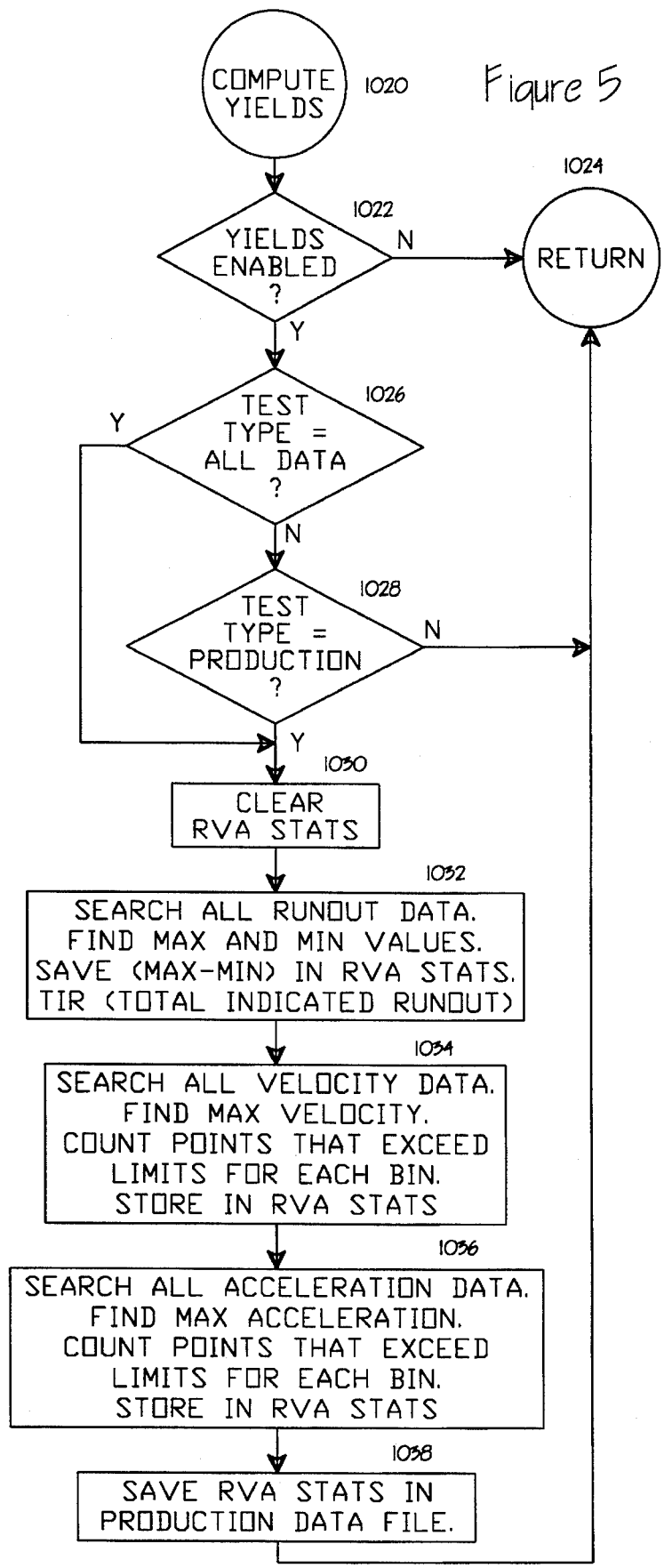
FIG. 5 shows in flow diagram form the Binning and Yields Process of the present invention.

All production binning and yield calculations are performed by a Binning and Yields Process 210. As data is collected by the Data Acquisition Process 208, functions in the Binning and Yields Process 210 are called to sort the data into bins and calculate percentage (%) yields. The binning module functions called by the Program Builder Process 202 and a Data Display Window Process 212A–212n permit transfer of the data between a Bins database and Yield data only in user selected formats communicated in the form of "Yield Menu Inputs". This permits the user to view the data while at the same time preventing direct access to the data which might lead to data corruption. The Binning and Yields Process is described in greater detail in connection with FIG. 5.

6. Display Manager

After data has been collected and stored, it may be displayed in a plurality of Data Display Windows 212A–212n which the user controls through a Display Manager Process 214. In a typical embodiment, the user may select from one to nine such Data Display Windows, although the particular number may be greater than nine in at least some embodiments. User requests to create, remove, or re-arrange the Data Display Windows are routed to the Display Manager Process 214 here by the User Input Process 200 where they are executed. User inputs for individual windows are routed here to the correct window along with the necessary data structures, This process is described in greater detail in connection with FIG. 6.

7. Data Display Window Process

All functions for the processing of data into displayable form are contained in the Data Display Window Process, where the Data Display Windows are shown as 212A–212n. The processing functions for each window are the same, only the data changes. RVA Data can be displayed in Tabular Text, 2D Linear, 3D Rectangular, and 3D Polar formats. Binning and yield data can be displayed in Tabular Text or Bar Chart formats. The 3D rendering functions use classical matrix transformations to create a 3D image on a 2D plane and thus are not described in the flow charts. The Scale Data Function contains the unique code for filtering the raw data so it may be displayed in a meaningful form. This process is described in greater detail in connection with FIG. 7.

It will further be appreciated from FIG. 2 that the User Input Process 200, in addition to the functions described above, can alter machine state data 220 (typically stored in RAM during operation and on disk upon system shutdown), can cause the Sequencer Process 206 to open the chuck of the spindle, can load new setup information into a Servo Control Process 222 from setup data 224, and can directly communicate with the Binning and Yields Process 210 through yield menu inputs.

The Sequencer Process 206 and the Data Acquisition Process 208 communicate with one another, and each receives machine state data 220. The Data Acquisition Process 208 communicates bidirectionally with the DAQ board 28 and Digital I/O board 30 through a DAQ and DIO Driver 226. The Data Acquisition Process also communicates bidirectionally with RVA Data storage 228, and can send commands to the Binning and Yields Process 210. The RVA also provides information to the Data Window Displays 212 and to the Binning and Yields Process 210.

The Sequencer Process 206 similarly communicates with the Stepper Indexer Board 26 by means of a Stepper Control Process 230. Likewise, the Servo Control Process 222 communicates bidirectionally with the servomotor control board 32.

The Binning and Yields Process 210, in addition to responds to commands from the Data Acquisition Process 208, Program Steps 204, the User Input Process 200, and the RVA Data storage 228, provides and receives data from Yield Data storage 232 and bins 234.

The Data Display Windows 212A-n, under the control of the Data Display Window Process, communicate with a Graphics Library 236 to provide the displays selected by the Display Manager 214, and the Graphics Library 236 in turn communicates with a Windows Graphical Display Interface 238. The Windows GDI 238 in turn provides video output to a monitor or CRT 18 and hard copy output to a printer 24.

In general, an exemplary operation of FIG. 2 is as follows: A user is presented with a series of pull-down menus from within the Windows™ environment. The menus permit the user to select to open the chuck on the spindle to permit a disk to be placed on the spindle for testing. In addition, the menus permit the user to define the parameters of the test and the type of data to be collected. Finally, the user is permitted to select what data will be displayed. Once the user has selected at least some of these parameters, the processing may begin by the selection of a "Run" command from the menus. The user is also permitted to cancel operations at various points in the processing.

In such an exemplary embodiment, typical menu selections available to the user are to "LOAD", which permits the user to load a setup file that contains data needed by the servo and stepper controllers to operate with a particular disk size (the presently preferred embodiment can operate with disks ranging in diameter from 1" or less to 8" or more); "TEST_DATA", which determines what data to save to disk after the test is complete, and can include options to save all velocity data, only production yield data, or to save no data to disk but instead make it available only for display; "SIDES", which simply determines which sides of the disk to test, such as top surface only, bottom surface only, or both; "UNITS", which simply distinguishes between linear units (millimeters or inches) or rotary units (RPM or radians/sec).

In addition, a "BIN" selection is available which allows the user to set the grading parameters for a disk under test. In a typical embodiment, up to sixteen grading bins may be selected by the user, with the user able to select grading parameters such as the TIR, velocity and acceleration thresholds for inclusion in a given bin. The user may also set the number of samples to be obtained at a given radius, set a range of radii to be examined, and set the number of radii to be examined in that range, which allows the system to determine the incremental increase (or step) in radius. As an example, an examination of a 3.5", or 95 mm, disk may involve examining radii in a range of 12.5 mm to 47.5 mm with a increment in radius ranging from 0.2 meters all the way down to $2 \times 10^7$ meters, with typically 2,000 to 3,000 samples per radius. Those skilled in the art will appreciate that the inner radius of 12.5 mm described above is less than the usual inside radius of such a disk; this range of measurement is permitted so that the inner radius of the hub clamp area may be examined, since many surface deformities can result from imperfections at the inner radius which are transmitted across the remainder of the disk when the disk is clamped to the hub.

The Program Builder Process 202 then converts the user inputs into a text file so that the Sequencer Process 206 can parse the program steps and activate the remaining processes and functions in the correct sequence to perform the user-selected tests and calculations. An RVA Header is created which reflects, basically, the parameters for testing, storage and display of the data. During execution of the program steps, the Sequencer Process 206 monitors the operation of the various processes for errors or completion, and prevents the user from performing any operations that may damage the machine or invalidate the data being collected. When the user-defined program completes, the data is either stored or displayed, or both, on the appropriate storage or output devices shown in FIG. 1.

Figures 1, 2, 3A:
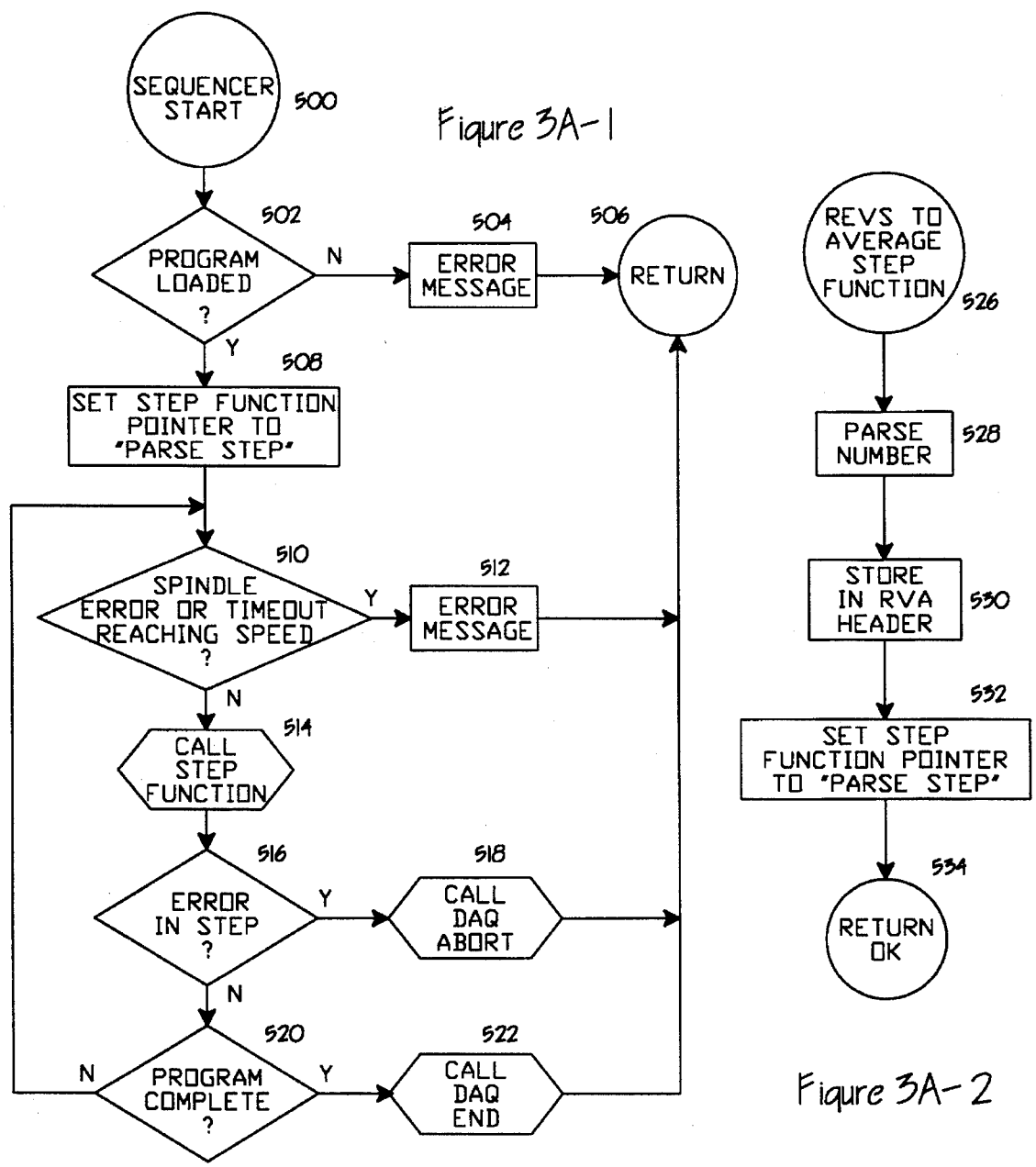

Referring next to FIG. 3A, the Sequencer Process 206 may be understood in greater detail. The process starts at step 500, and begins at step 502 by checking to determine that a program has been loaded from program steps 204. If not, an error message is generated at step 504 and the process returns at step 506.

However, in most cases a program will have been loaded, so that the check at step 502 yields a "yes" response. The process then continues at step 508 by setting a step function pointer to "parse step", for controlling the stepper indexer. A check is then made at step 510 to ensure that the spindle is operating correctly. If a spindle error occurs, or a timeout occurs waiting for the spindle to reach speed, an error message is generated at step 512, and again the process returns at step 506. As before, however, the typical response will be that no error occurred, in which case the process continues by calling a step function at step 514. The various step functions which may be called at this point are shown in FIGS. 3A-2 through 3F-2.

Following the call of the step function, a check is made at step 516 to ensure the step function occurred properly. If an error did occur, a call is made at step 518 to abort the data acquisition process, and again the process returns via step 506. However, if no error occurred, which is the usual case, the program continues by checking at step 520 to see if the step function called at step 514 was the last step in the program 204. If it was, the program ends normally by calling a DAQ END process at step 522. If other steps remain, however, the process loops to the point following step 508 and continues by performing the various checks and executing each step in sequence until the process does complete.

Referring next to FIG. 3A-2, the "Revolutions to Average" step function can be appreciated. The function begins at step 526, and simply comprises parsing the number at step 528, followed by storing the number in step 530, setting the step function pointer to "parse step" in step 532, and returning at step 534.

Referring next to FIG. 3B-1, the "Parse" step function of step 514 from FIG. 3A-1 can be better understood. The function starts at step 540 and begins at step 542 by getting the next step in the program buffer 204. A check is then made at step 544 to determine whether the next step in the buffer 204 is a valid step. If not, an error message is generated at step 546 and an error is returned at step 548. However, if the step is valid, the function continues at step 550 by setting the step function pointer to the processing function for the next step, followed by return at step 552.

Similarly, a sides step function is shown in FIG. 3B-2 beginning at step 554, followed by parsing the sides to test at step 556. The function simply determines which sides of the disk are to be tested and, at step 558, stores this data in the RVA HEADER, which is a buffer defined in RAM during operation and stored to disk thereafter. At step 560 the step function pointer is set to "Parse Step", and the function returns at step 562.

Figures 1, 4A:
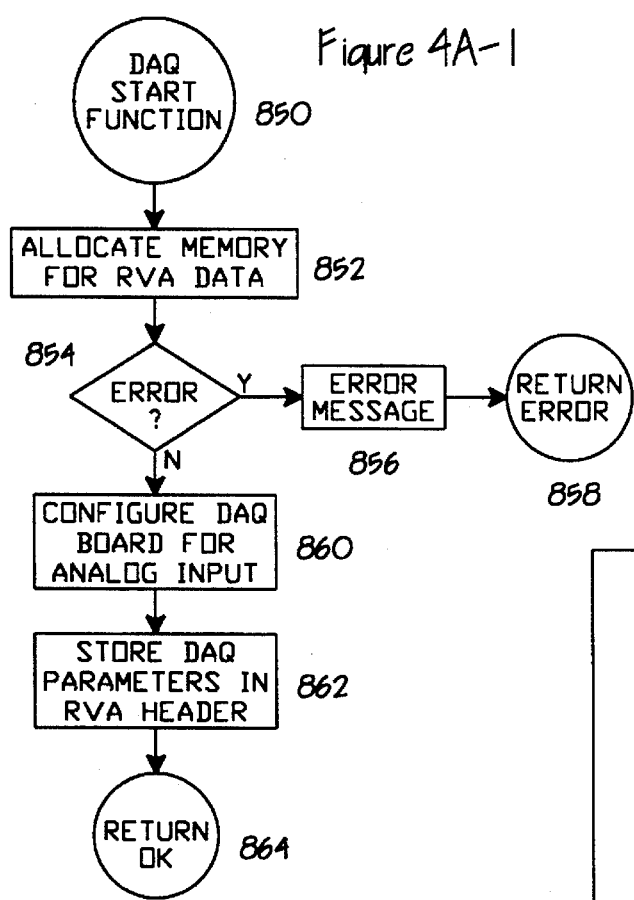
Figures 2, 4A:
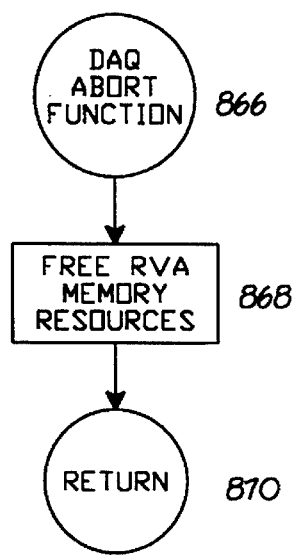
Figures 3, 4A:
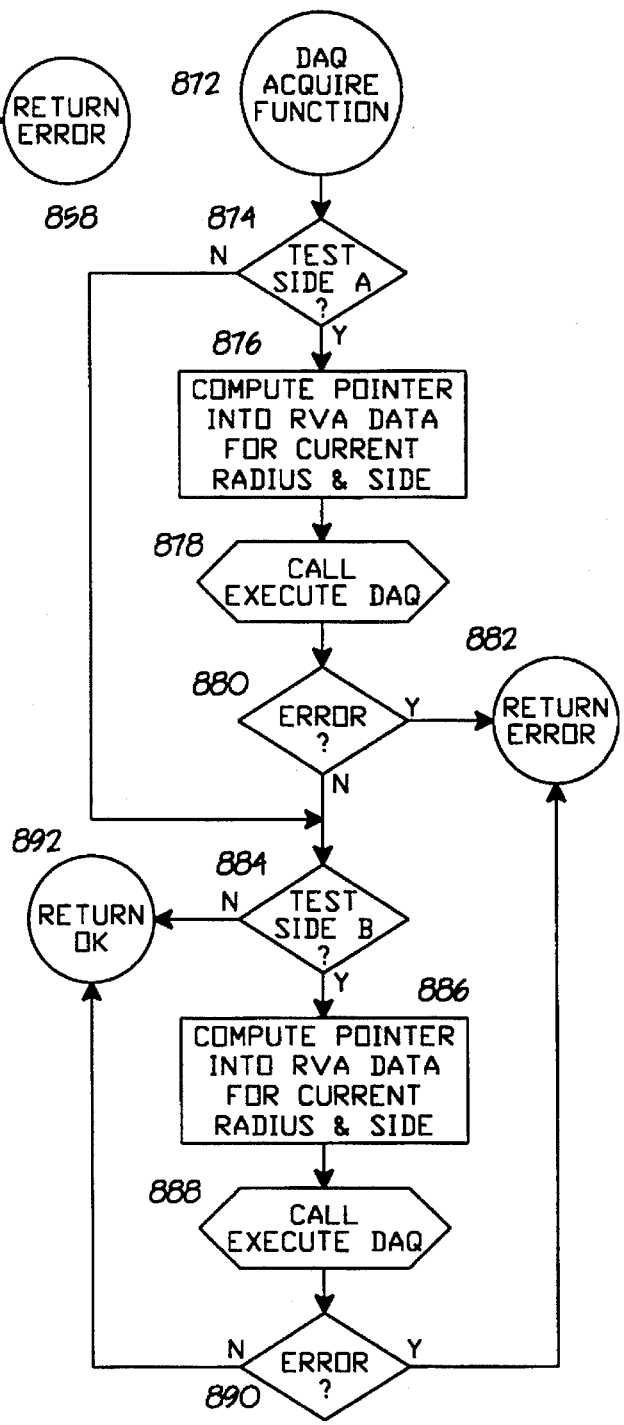

A load function for the stepper is shown in FIG. 3B-3, and begins at step 564, followed by parsing the filename at step 566. A check is made at step 568 to determine whether the filename exists. If not, an error message is generated at step 570 and returns at step 572. If the filename does exist, the setups are loaded into the servo control board 32 at step 574. A check is made at step 576 to ensure that the setups loaded correctly. If an error occurs in loading the setup information, an error message is generated at step 578 and returns, as before, at step 572. If no error occurred, the step function pointer is set to "parse step" at step 580 and the function returns at step 582.

Figures 1, 2, 3C:
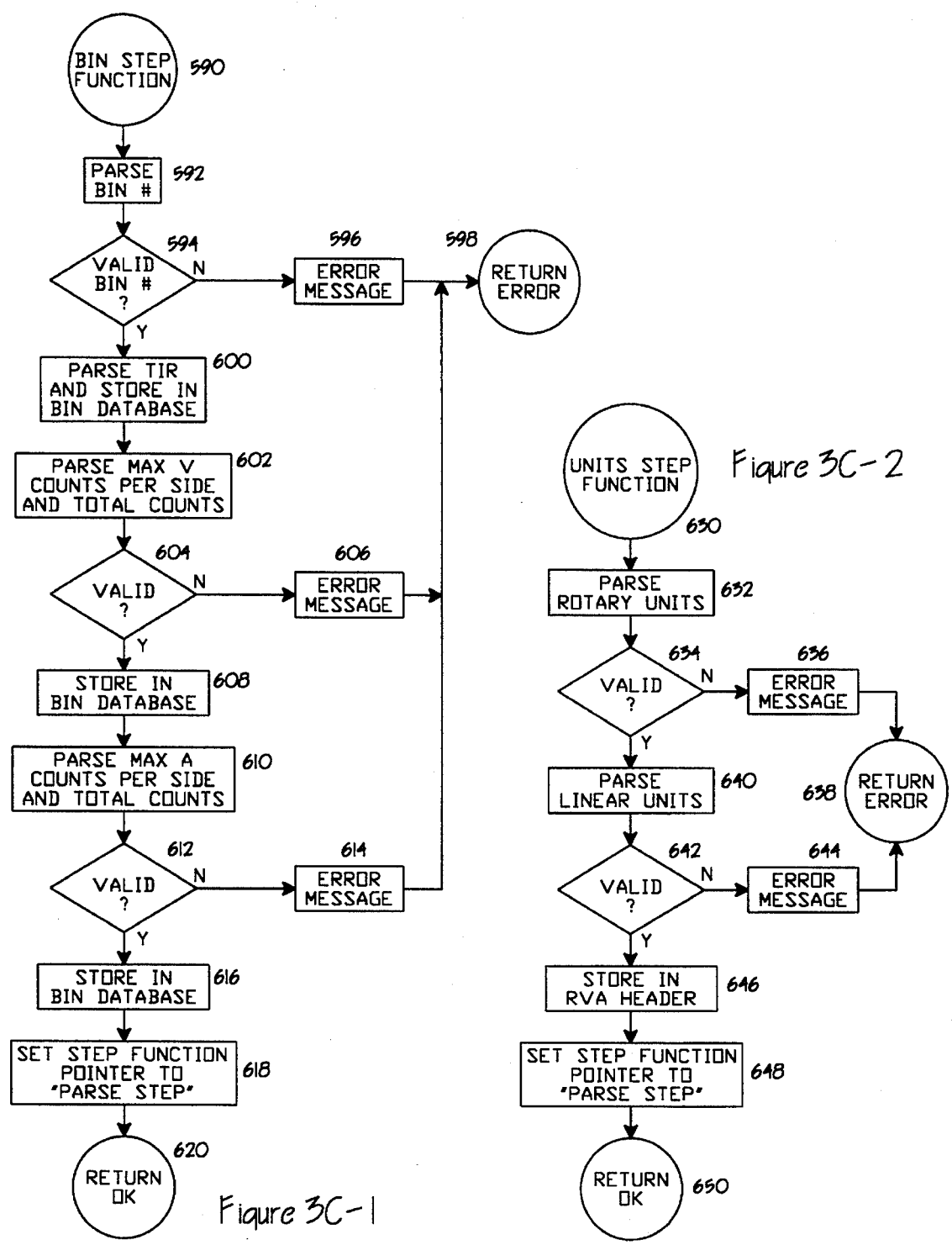

Referring next to FIG. 3C-1, the bin step function is described. The function begins at step 590 and continues by parsing the selected bin number at step 592, followed by checking at step 594 to ensure that a valid bin number has been selected. If not, an error message is generated at step 596 and returned at step 598.

However, if the bin number is valid, the function continues at step 600 by parsing TIR, or Total Indicated Runout, and storing it in a BIN database maintained (at least during testing) in RAM. The function continues at step 602 by parsing "Max V" (maximum velocity) counts per side and total counts. If the result fails a validity check at step 604, an error message is generated at step 606 and the function returns at step 598. However, if the counts are valid, the function continues at step 608 by storing the data in the bin database. The function continues at step 610 by parsing max A counts per side and total counts, and then checking at step 612 to ensure that the resulting data is valid. If not, an error message is generated at step 614 and returned at step 598. However, in most cases the data is valid, in which event it is stored in the bin database at step 616, followed by setting the step function point to "parse step" at step 618 and returning following successful completion at step 620.

Referring next to FIG. 3C-2, the units step function can be better understood. The function begins at step 630 and continues by parsing the rotary units at step 632. A check is then made at step 634 to determine if the parsing is valid; if not, an error message is generated at step 636 and returned at step 638. However, if the parsing is valid, as will typically be the case, linear units are then parsed at step 640. A validity check for the linear parsing is then made at step 642, and again an error message is generated if the parsing is not valid, this time at step 644 with an error return at step 638.

If the linear parsing is valid, the data is stored in the RVA header at step 646, and the step function pointer is set to "parse step" in step 648, followed at step 650 by an "ok" return.

Referring next to FIG. 3D-1, the radii step function can be better understood. The function begins at step 660, and continues at step 662 by parsing the number of radii. A check is then made at step 664 to ensure that the data from step 662 is valid. If not, an error message is generated at step 666 and an error returns at step 668. For valid data from step 662, the process continues at step 670 by storing the data in the RVA header and setting the step function point to "parse step" at step 672, followed by a normal return at step 674.

Turning next to FIG. 3D-2, the home step function can be better appreciated. The function begins at step 680, and continues at step 682 by checking to see if the slider carriage is in home position. If so, the function continues at step 684 by checking to determine whether the spindle is stopped. If not, and also if the carriage is not in the home position when checked at step 682, the function continues at step 686 by telling the servo control board 32 to stop the spindle, and then continues at step 688 by telling the indexer 26 to move to position 0.

A check is then made at step 690 to verify that no error occurred in moving the carriage to the home position and stopping the spindle. If no error occurred, and also if the spindle was stopped when checked at step 684, the function continues at step 692 by setting the step function pointer to "parse step" and setting a normal return at step 694. If an error was found at step 690, an error message is generated at step 696 and an error returned at step 698.

Referring next to FIG. 3D-3, the test type step function can be better understood. The function begins at step 700, and continues by parsing the test type at step 702. A check is then made at step 704 to determine if a valid result was obtained, and if not an error message is generated at step 706 and an error returned at step 708. However, if the data checked valid in step 704, the data is stored in the RVA header at step 710, and the step function pointer is set to "parse step" in step 712, followed by a normal return in step 714.

From FIG. 3D-4, the samples step function can be better understood. The function begins at step 716, followed by parsing the number of samples at step 718, and storing the data in the RVA header at step 720. Then the step function pointer is set to "parse step" in step 722, followed by a normal return at step 724.

Figures 1, 2, 3E:
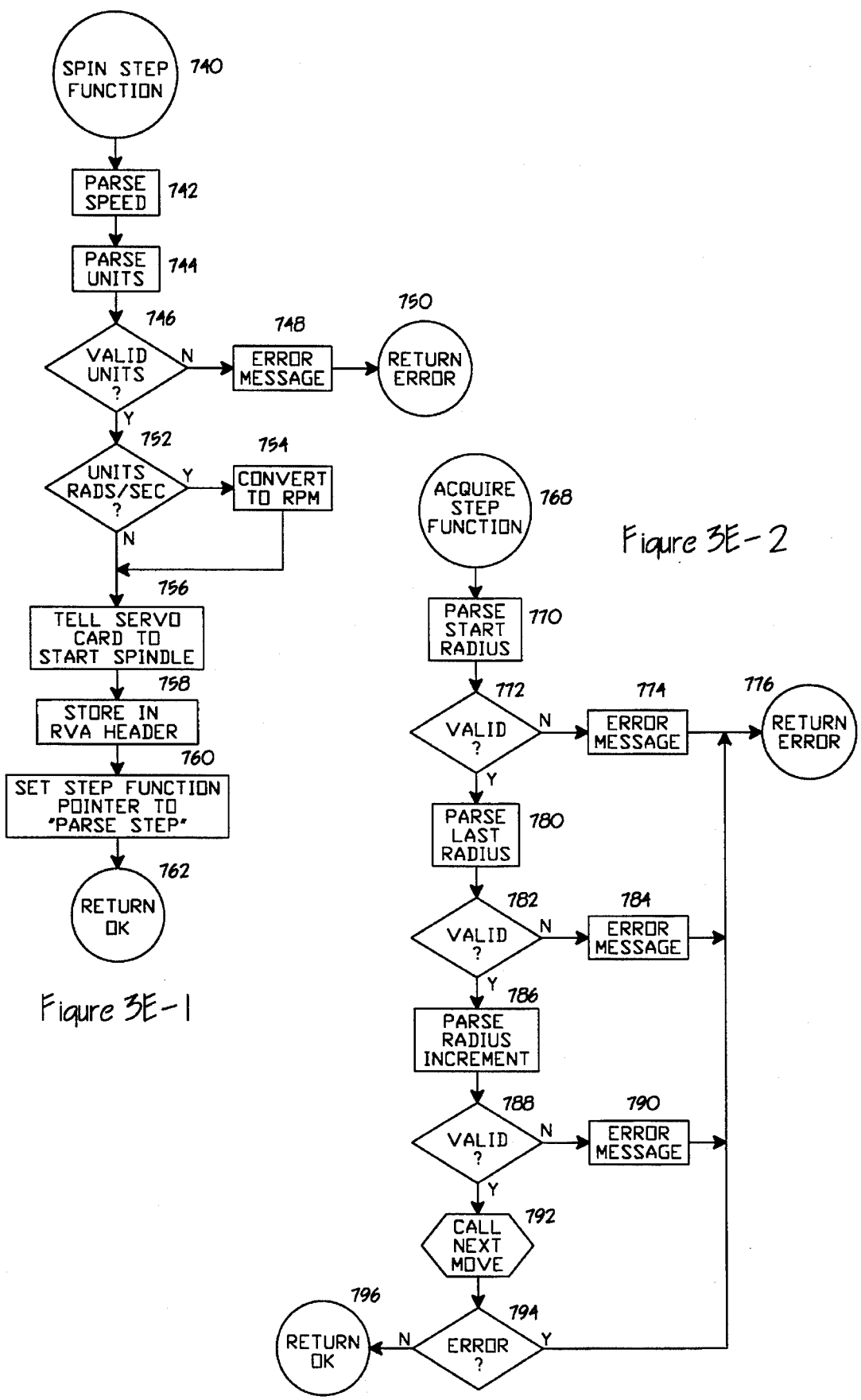
Figures 1, 3F:
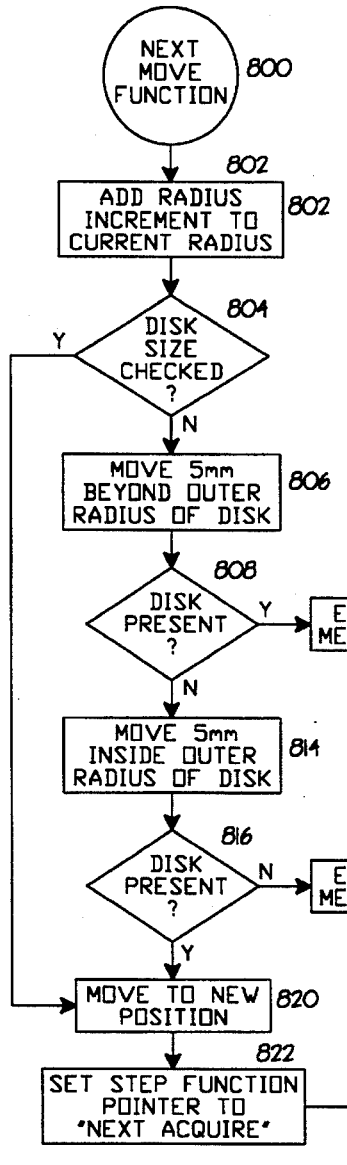
Figures 2, 3F:
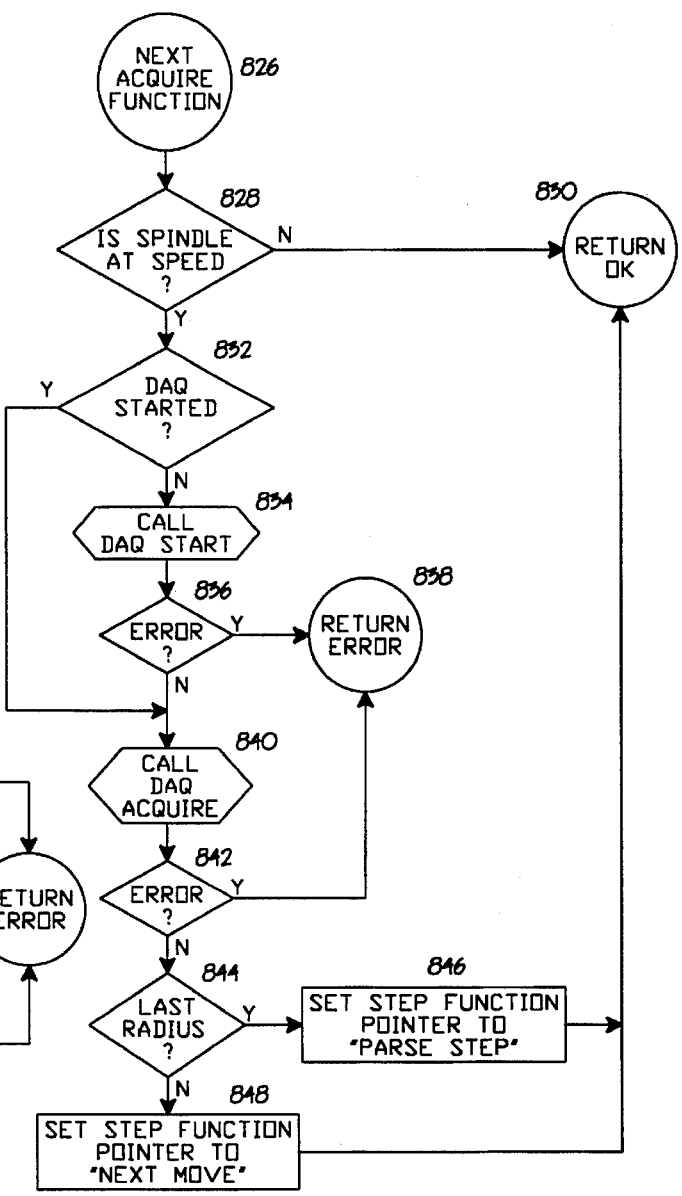

FIG. 3E-1 shows in greater detail the spin step function of the Sequencer Process 206. The function begins at step 740 and continues at step 742 by parsing the speed and at step 744 by parsing the units. A check is then made at step 746 to determine whether the units are valid, and if not an error message is generated at step 748 and an error returns at 750.

If no error is found at step 746, a check is made to determine if the data units are radians/sec. If so, the data is converted to RPM at step 754. After the conversion of step 754, or if the units are already converted as indicated by a "no" response from the check at step 752, the function continues at step 756 by causing the servo card to start the spindle, and then store the data in the RVA header at step 758. The step function pointer is then set at step 760 to "parse step", followed by a normal return at step 762.

In FIG. 3E-2 the acquire step function is shown. The function begins at step 768 and continues by parsing the start radius at step 770. A check is made at step 772 to ensure the resulting data is valid and, if not, an error message is generated at step 774 and an error returns at step 776. If no error is found at step 772, the process continues by parsing the last radius at step 780, followed by a validity check at step 782. If an error results at step 782, an error message is generated at step 784 and, again, an error returns at step 776. If no error is found at step 782, the radius increment is parsed at step 786. Another check is then performed at step 788 to verify the validity of the data, and if an error is found an error message is generated at step 790, followed by return of an error at step 776. If no error is found at step 788, the next move is called at step 792, after which yet another error check is made at step 794. If an error results at step 794, an error return from step 776 results; otherwise a normal returns results at step 776.

Referring next to FIG. 3F-1, the "Next Move" function of the Sequencer process can be better appreciated. The function starts at step 800 and continues at step 802 by adding a preselected radius increment to the current radius. The disk size is then checked at step 804 to verify that the correct size of disk has been loaded and prevent possible damage to the system. If a negative answer is returned, the slide is moved a predetermined amount, for example 5 mm, beyond the outer radius of the disk.

A further check is made at step 808 to determine whether a disk is present at the new location and, if so, an error message is generated at step 810 and an error returns at step 812. If no disk is found, the slide is moved a second predetermined amount at step 814, which again may be 5 mm, inside the outer radius of the disk. Another check is then made at step 816 to determine if a disk is present. If not, an error message is generated at step 818 and an error returns at step 812. If a disk is present as expected in step 816, or if disk size had already been checked at step 804, the function continues at step 820 by moving to a new position. The step function pointer is then set to "next acquire" at step 822, and a normal returns is generated at step 824.

The "next acquire" function can be better understood from FIG. 3F-2. The function begins at step 826 and continues at step 828 by determining if the spindle is at speed. If not, a return issues at step 830. If the spindle is at speed, a check is made at step 832 to determine whether the Data Acquisition Process has started. If not, the DAQ process is called at step 834. An error check is then made at step 836 and, if an error is found, a error return is generated at step 838.

If no error occurred at step 836, or if the DAQ process had already started when checked at step 832, the function continues at step 840 by calling the DAQ Acquire process. A further error check is conducted at step 842; if an error is found an error return is generated at step 838. If no error is found, a check is made at step 844 to determine whether the slide is at the last radius. If so, the step function pointer is set at step 846 to "parse step"; if not, the step function pointer is set to "next move"; in either event a "return ok" is generated at step 830.

The Data Acquisition Process 208 may be understood in greater detail from FIG. 4, which comprises FIGS. 4A-1 through 4D-2. In particular, the DAQ Start function begins at step 850 and then continues at step 852 by allocating memory for RVA data. An error check is then made at step 854 and, if an error is found, an error message is generated at step 856 and an error returns at step 858.

If no error is found at step 854, the function continues by configuring the DAQ Board for analog input at step 860. Next, at step 862, the DAQ parameters are stored in the RVA header, followed by a normal return at step 864.

The DAQ Abort function is shown in FIG. 4A-2, and begins at step 866 followed by freeing RVA memory resources at step 868, and a normal return at step 870.

The DAQ Acquire function is shown in FIG. 4A-3, and starts at step 872. The function continues at step 874 by determining whether to test side A of the sample 42. If it is determined to test side A, a computation is made at step 876 of the pointer into the RVA pointer for current radius and side, followed by calling the Execute DAQ function at step 878.

A check is made at step 880 to determine whether an error occurred in calling the Execute DAQ function. If an error is detected, an error returns at 882. If no error is detected, or if the determination is made not to test side A, the function continues by determining whether to test side B at step 884. If it is determined to test side B, the function continues at step 886 by computing the pointer into the RVA data for the current radius and side. The Execute DAQ function is then called at step 888, followed by a check for an error at step 890. If error occurs at step 890, an error is returned at step 882; if not, a normal return occurs at step 892.

Figures 1, 4B:
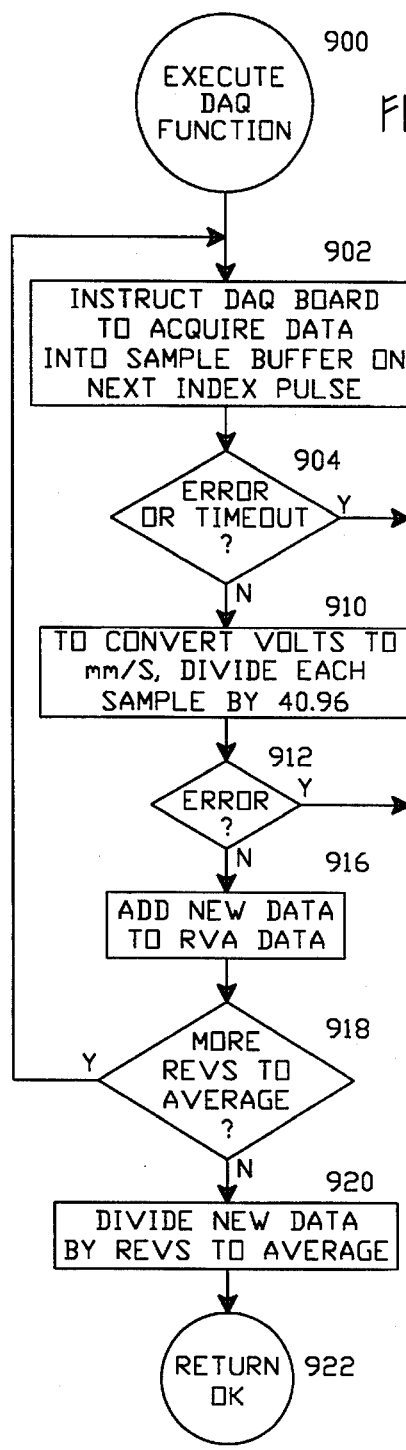
Figures 2, 4B:
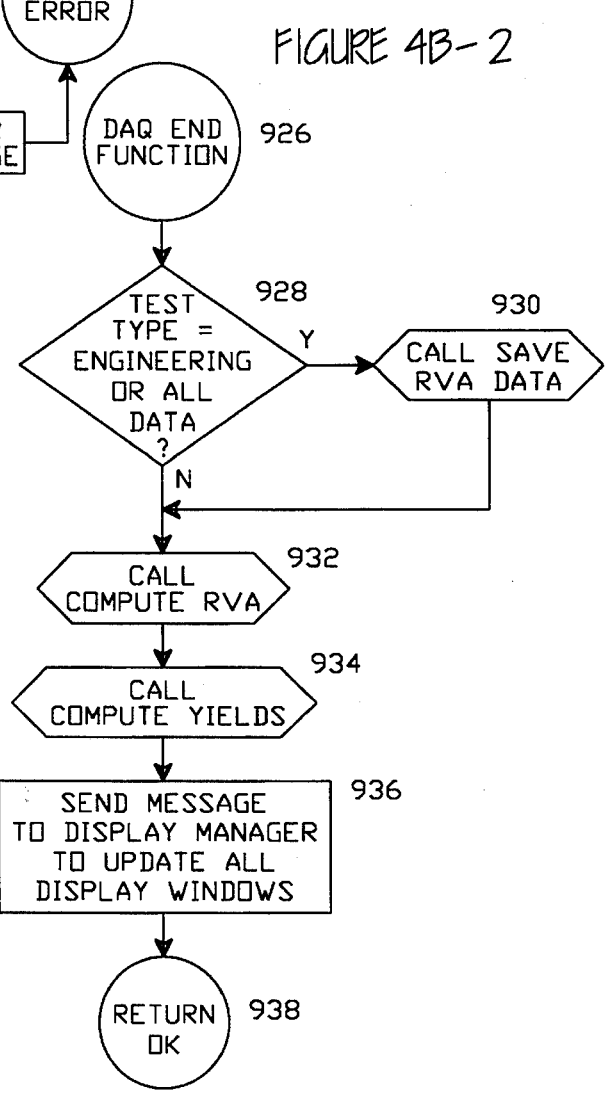

Referring next to FIG. 4B-1, the Execute DAQ function can be better understood. The function starts at step 900 and continues at step 902 by instructing the DAQ Board 28 to acquire data into the sample buffer located in RAM on the next index pulse, followed by checking for an error or timeout at step 904. If an error or timeout occurs, an error message is generated at step 906 and an error returns at step 908.

If no error or timeout occurs at step 904, the function continues by converting voltage to mm/S or other suitable velocity units at step 910. Another error check is made at step 912, and if an error is detected an error message is generated at step 914 and an error returns at step 908.

If no error is detected at step 912, new data is added to the RVA data at step 916. A check is made at step 918 to determine whether there are more revolutions to average. If so, the function loops to the top of step 902; if not, the function continues at step 920 by dividing the new data by the number of revolutions to achieve an average. The function returns at step 922.

FIG. 4B-2 illustrates the DAQ end function, beginning at step 926. The function continues at step 928 by determining test type, to determine what data the user has chosen to save to disk. If the test type is engineering, the function continues by calling the "save RVA data" function at step 930; if not, or after the "save RVA data" function is completed, the function continues by calling the "computer RVA" function at step 932. The "computer yields" function is then called at step 932, followed by sending a message to the Display Manager process 214 to update all display windows. The process ends by returning at step 938.

Figure 4C:
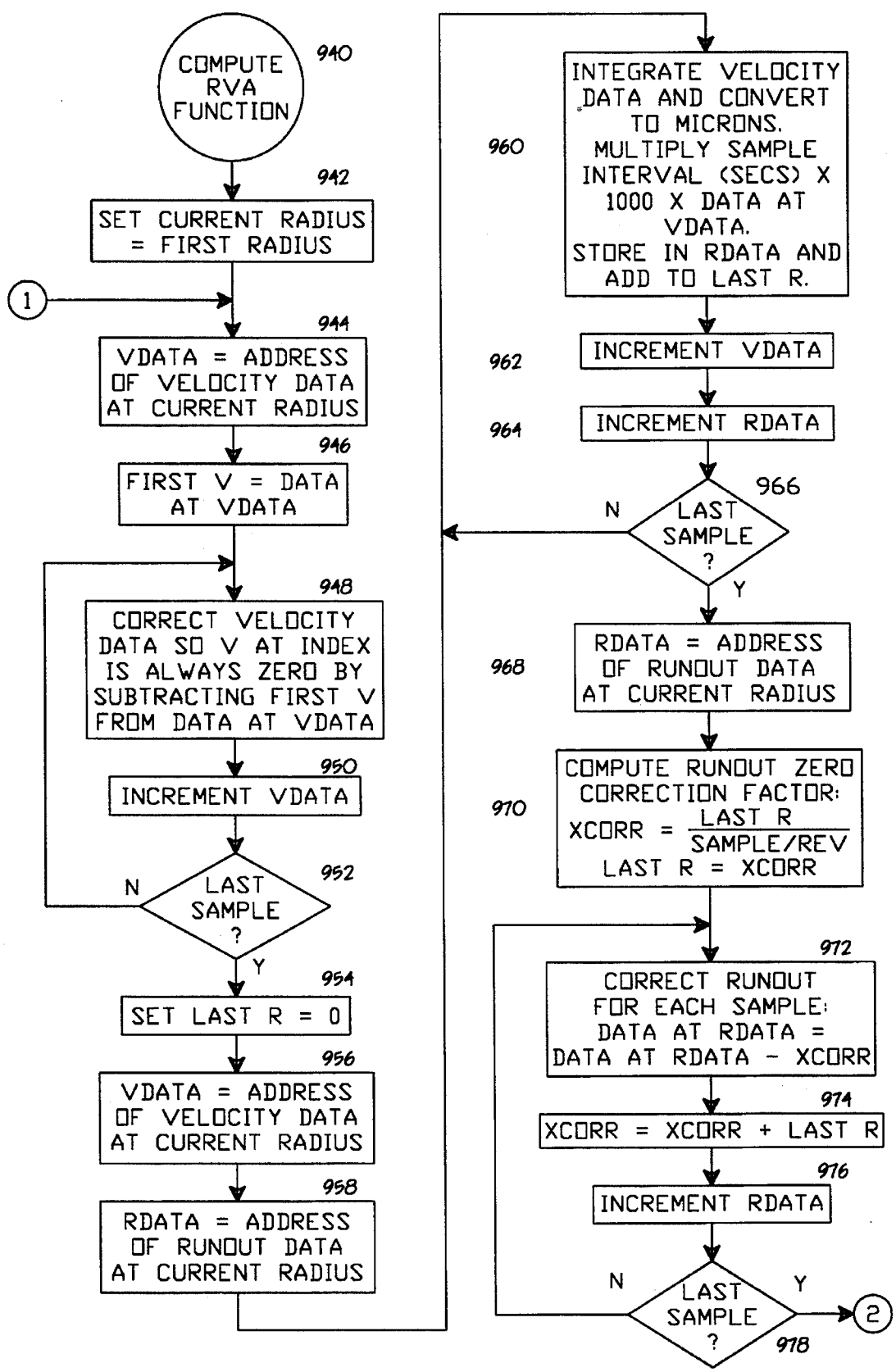

The next function to-be considered is the "compute RVA" function, shown in FIG. 4C, and is fundamental to the present invention although certain specific steps in the process may be altered without materially altering the focus of the invention. The process begins at step 940 and continues at step 942 by setting the current radius equal to the first radius, as selected by the USER, followed at step 944 by setting the variable VDATA equal to the address of the velocity data at the current radius.

At step 946, the first velocity V is set equal to the data at VDATA, followed at step 948 by correcting the velocity data so V at index is always zero. This is accomplished by subtracting the first V value from the data at VDATA. In effect, this acknowledges that the disk is rotating, so that data is acquired in circular fashion. Since drift and other inaccuracies can (falsely) cause the end point of the circle not to equal the beginning point, it is possible to correct for those inaccuracies simply by setting the values at index equal. This concept, although relatively simple to understand once recognized, has escaped many prior art workers.

After correction of the velocity data in step 948, VDATA is incremented in step 950. A check is then made at step 952 to determine whether that sample is the last sample; if not, the function loops to the top of step 948 and an additional sample is taken. If the sample is the last sample, the function continues at step 954 by setting the last radius R to zero. Then, at step 956, VDATA is set to the address of the velocity data for the current radius (R), followed at step 958 by setting RDATA equal to the address of the runout data of the current radius.

At step 960, the velocity data is integrated and the units are converted to microns, by multiplying the sample interval in seconds by a suitable multiplier (such as $10^3$) times the data at VDATA. The resulting value is stored in RDATA and added to the last R value. At, step 962, VDATA is incremented, followed at step 964 by incrementing RDATA. Another "last sample" check is made at step 966, and if more samples remain to be processed the function loops to the beginning of step 960. If the sample was the last sample, the function continues at step 968 by setting RDATA equal to the address of the runout data at the current radius, followed at step 970 by computing the runout zero correction factor. A presently preferred method for calculating such correction is to calculate

XCORR=LAST R/(SAMPLE/REV), where

CURRENT R=XCORR.

The function continues at step 972 by correcting the runout for each sample by setting the data at RDATA equal to the prior value of the data at RDATA less the XCORR value, At step 974, XCORR is then set equal to XCORR+ CURRENT R, and the data is incremented at step 976, followed by another "last sample" check at step 978. If not the last sample, the function loops to the beginning of step 972; if it is the last sample, the function continues as shown on FIG. 4D-1 by setting, at step 980, by setting the value of VDATA equal to the address of the velocity at the current radius. Then, at step 982, the value of the variable ADATA is set equal to the address of the acceleration at the current radius, followed at step 984 by differentiating the velocity data and converting to meters/sec$^2$. This conversion can be represented by the formula dV/Sample Interval/1000 where dV is the value of the data at VDATA less the value of the data at the sample (VDATA−1).

The function continues at step 986 by checking to determine if VDATA is the first point and, if so, wrapping around to the last point for the value of (VDATA−1). Then, at step 988 the value of VDATA is incremented, followed at step 990 by incrementing the value of ADATA. A "last sample" check is then made at step 992, and if not the last sample the function loops to the beginning of step 984. If it is the last sample, the current radius is incremented at step 994, followed at step 996 by a check of whether the last radius is being sampled. If not, the function returns back to step 944 for computation of RVA values for additional radii; if no other radii remain to be sampled, a normal return is issued at step 998.

Figures 1, 4D:
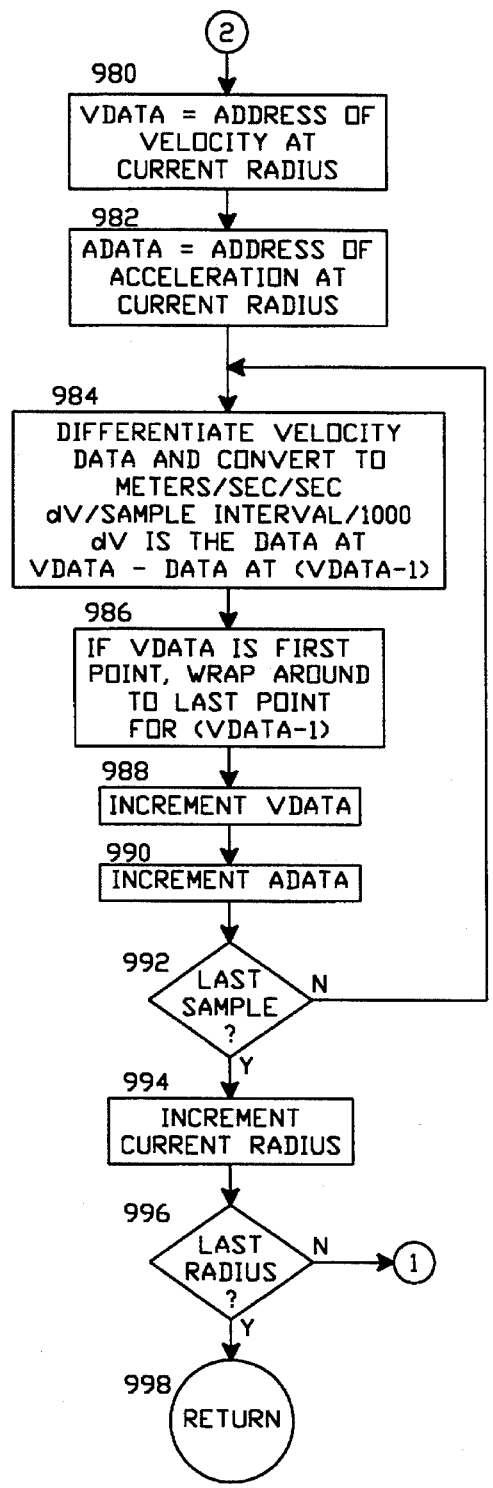
Figures 2, 4D:
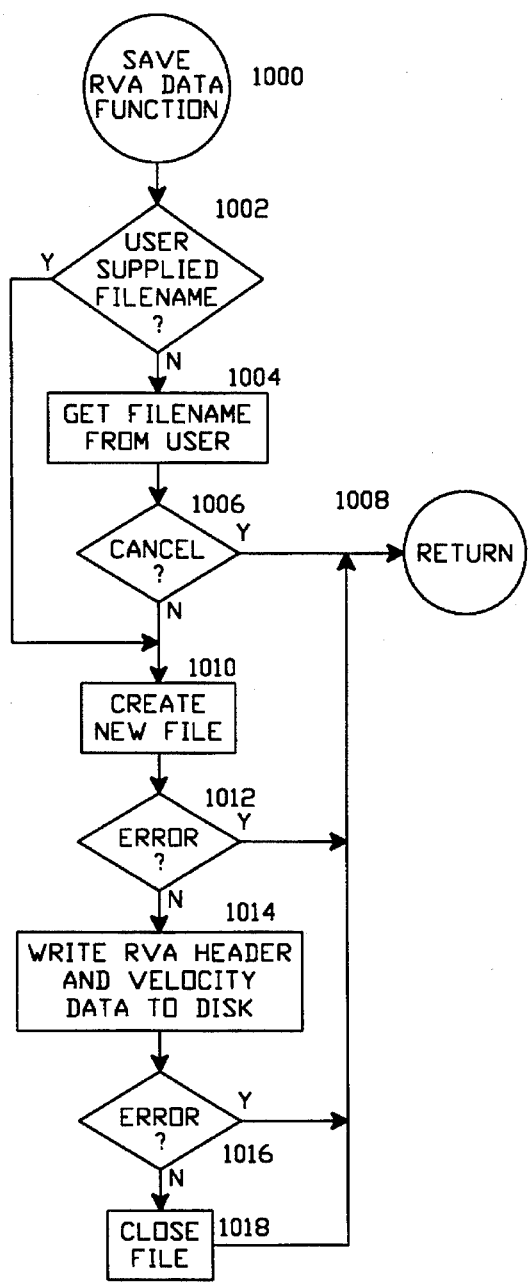

Referring next to FIG. 4D-2, the "save RVA data" function can be better understood. The function begins at step 1000, and continues at step 1002 by checking whether a user supplied filename already exists. If not, at step 1004 the user is requested to provide a filename. The user can cancel at step 1006, in which case a return issues at step 1008; otherwise the user either supplies a new file name or, if one already existed when checked at step 1002, a new file is created at step 1010, followed by an error check at step 1012. An error causes the issuance of a return at step 1008, but a "no error" condition advances the function to step 1014, where RVA header and velocity data is written to disk. Another error check is performed at step 1016 to ensure the information was written successfully, followed by either an error return (step 1008) if an error occurred, or a closing of the file at step 1018 followed by a normal return at step 1008.

Following calculation of the RVA information, binning and yield information must be provided. This process, shown at 210 in FIG. 2, can be better understood from FIG. 5, which begins at step 1020. The process continues at step 1022 by checking to determine whether yields processing has been enabled. If not, a return issues at step 1024; otherwise the process advances to steps 1026 and 1028, where a check is made to determine how the variable TEST TYPE is set. At step 1026 the check determines whether the variable is set to "all data", followed at step 1028 by a check to determine if the variable to set to "production". If the response is negative to both steps 1026 and 1028, the setting is erroneous and a return issues from step 1024. Otherwise, either by a jump from an affirmative answer at step 1026 or an affirmative answer at step 1028, the RVA statistics are clears at step 1030.

At step 1032 a search of all runout data is made, and the maximum and minimum values are found. The max and min values are saved to the RVA stats as TIR, or, again, Total Indicated Runout. The function continues at step 1034 by searching all velocity data, finding the maximum velocity, counting the samples or points that exceed the limits for each bin (which may be zero), and storing that data in the RVA statistics.

Similarly at step 1036, the acceleration data is searched, the maximum acceleration is found, the samples or points are counted that exceed user defined limits, and that data is stored in the RVA statistics. The RVA statistics are then stored at step 1038 in the production data file, followed by a normal return issuing from step 1024.

Once the data is acquired and calculated, it must be displayed in an intelligible manner. The Display Manager process 214 (FIG. 2), which in a preferred embodiment operates under the Microsoft Windows™ environment, provides this functionality, and its aspects can be better understood from FIGS. 6A–6E. One of the fundamental aspects of the present invention is that multiple windows can be created, with each displaying a different data set. The creation of a new window varies in a novel manner from that used within Microsoft Windows™. New windows are referred to as "child" windows, and in Microsoft Windows™ are managed under the Multiple Document Interface. Such child windows are created and arranged so that they always fit within the main window client area, but can be either cascaded or tiled within that area. The child windows are required to be in front of, never behind, the main window, and menu inputs are handled only through the menu bar of the main window. When a child window is active, the menu bar inputs from the main window are directed to that child window. Those familiar with Windows will recognize this process from the operation of the Windows™ Program Manager on each of the groups.

However, in at least some instances it is less confusing and more efficient to include a menu bar with each child window, where the functions of that menu bar affect only that window. If only the main menu bar is allowed, the user must first activate the child window, then move back to the menu bar on the main window. In addition, the main window menu bar frequently includes menu selections which are not intended to apply to the child window. By the present invention, it is possible to provide each child window with its own menu bar.

In general, child windows are formed in the present invention in the same manner as the main window, and then all Microsoft Windows™ messages destined for child windows are intercepted by the Display Manager process. In effect, the Display Manager process serves as a filter for receiving messages from Microsoft Windows™ and routing those messages to the various display windows. The windows manager of the present invention simulates the MDI functions that destroy, tile, cascade, select and position child windows.

The Display Manager process includes the functions necessary to create, destroy, tile, cascade, select and position on top of the main window the child windows. It maintains a table of pointers to unique data structures associated with each window, which permits different data to be displayed in each window. All child windows use one message processing function which directs messages destined for child windows to the appropriate Display Window message handler along with a pointer to its data area.

Special processing is required on the Microsoft Windows™ WM_CREATE message. Before a new window is created, the display manager of the present invention searches the data pointer table looking for an empty location. If none are available, the user is alerted and the request fails. If one is found, a global variable is set to this new index. When the default message handler gets the WM_CREATE message, it uses this global variable to determine the index into the table where the data pointer lies. This is necessary because Microsoft Windows™ does not return a handle for a new window until after the CreateWindow call returns.

The Display Window process, discussed in greater detail below, provides the functions for processing messages received from Microsoft Windows™. However, the message handler of the present invention includes an additional parameter which points to the unique data structure associated with each child window of the present invention. The foregoing general description can be better understood from FIGS. 6A–6E and FIG. 7A-1 to 7G, discussed below.

To implement the approach discussed above, a popup menu entitled "VIEW" is added to the main window. In an exemplary embodiment, the "VIEW" menu provides selections for: NEW, Close All, Tile Windows, Cascade Windows, and subsidiary choices for Window 1, Window 2, and so on. As windows are created, their titles are added to the View menu and as they are destroyed, their titles are removed. This occurs in the Display Manager Enable Menu function (FIG. 7A–C) which is called just before Microsoft Windows™ displays the VIEW popup menu.

The first function to be considered in the Display Manager process is the View New function, shown in FIG. 6A as beginning at step 1050, which permits a new window to be created. The function continues at step 1052 by checking to determine the number of windows which are open. For the preferred embodiment the maximum number of windows has been arbitrarily set to nine, with the user able to choose to open from one to nine such windows for the display of user-selected data. However, in other embodiments any number of windows may be used. For the preferred embodiment, if the number of open windows exceeds nine, an error message is generated at step 1054.

The maximum window size is then calculated at step 1056, followed by creating a new window and initializing its data structures to appropriate default values at step 1058. The window is then added to the window list at step 1060. A return then issues at step 1062, either from successful completion of step 1060 or from an error at step 1054.

The "View Close All" function may be better understood from FIG. 6B, where the function begins at step 1070 and continues by checking at step 1072 to determine whether any display windows are open. If any are, a "destroy" message is sent at step 1074 to the next window in the list, followed by recycling back to step 1072 until no windows are open. Once no windows are open, a return issues at step 1076.

FIG. 6C shows the "VIEW UNITS" function in greater detail, where the function begins at step 1080 and continues at step 1082 by displaying on the monitor or other output device a dialogue box showing linear and rotary options. The user responds by selecting from the options, and a check is then made at step 1084 to determine whether the user is done selecting options. If not, the user is prompted to select further options; if so, at step 1086 the global units data structure and strings are updated. A return then issues at step 1088.

FIG. 6D shows the "View Tile" function, which begins at step 1090 and continues at step 1092 by dividing the screen space so that all display windows are the same size and moving the windows, at step 1094, so that none overlap. The process returns at step 1096.

FIG. 6E provides cascading of the windows, and begins at step 1100. In steps 1102 and 1104 the windows are resized and moved so that they overlap but permit the menu bars to remain visible. A presently preferred resizing is 65% of the screen size, although other ratios are acceptable. A return then issues at step 1106.

Finally, the process of actually displaying the data in a window must be understood. FIGS. 7A-1 through 7F illustrate in flow diagram form the Data Display Window process 212 from FIG. 2, beginning with the "Default Display Window Process" function in FIG. 7A-1, which begins at step 1200 and provides a method for routing the data to be displayed, or message, to the appropriate window. The function continues at step 1201, which checks to determine whether a new window is being created. If so, the function branches to step 1202, where the Windows™"create window" process is called. In addition, step 1202 causes the pointer to be moved to the new data area so that the function knows where the data is held until a window handle is returned by Windows™. Importantly, the "create window" call is used rather than the "create MDI child window". This creates a window capable of having a menu bar, but also requires that messages from the Windows™ message handler be intercepted by the Display Manager process so that messages are routed to the correct child window, since the windows, while appearing like MDI child windows on the screen, are in fact equivalent to the main window such that the Windows™ message handler would be unable to determine the appropriate window for specific messages.

If a new window is not being created, the function advances to step 1203, where a check is made to determine whether a given message is for a window in the list. If so, the function branches at step 1204 by getting the pointer to the data area from the list. At this point the Display Manager of the present invention intercepts message to route them to their proper destination. If not, the function advances to step 1205, which calls the MS Windows™ default message handler.

If a branch occurred at either step 1201 or 1203, such that the functions of steps 1202 and 1204 are executed, upon completion of those steps the function advances to step 1206 by calling the display window process. Upon completion of either step 1205 or step 1206, a return issues at step 1207.

The "Display Window Data—3-D Plot" function may be appreciated from FIG. 7A-2, which begins at step 1208 and continues at step 1209 by calling the "View Data Parameters" function, explained further in connection with FIG. 7B-1, discussed below. A check is then made at step 1210 to determine whether a cancel instruction has been received and, if not, a call is made at step 1211 to the "Format Data 3-D Plot" function (see discussion of FIG. 7B-2, below). A return then issues at step 1212, either from the cancel at step 1213 or completion of the call at step 1214.

Referring next to FIG. 7A-3, the Display Manager Enable Menu function can be understood. The function begins at step 1213 and continues at step 1213 by checking whether any child windows are open. If not, the function branches to step 1215 where the menus of the child windows are made inactive ("greyed"), the windows are titled, and the windows menus are cascaded. If child windows were open, the function advances to step 1216, where a separator is added to the menu, followed at step 1217 where the function gets a child window title for the first child windows still open. The title is then added to the bottom of the menu at step 1218, followed at step 1219 by checking to see if there are more child windows still open. If there are, the function loops to the top of step 1217; if not, or upon completion of step 1215, the function returns at step 1220.

Figures 1, 7B:
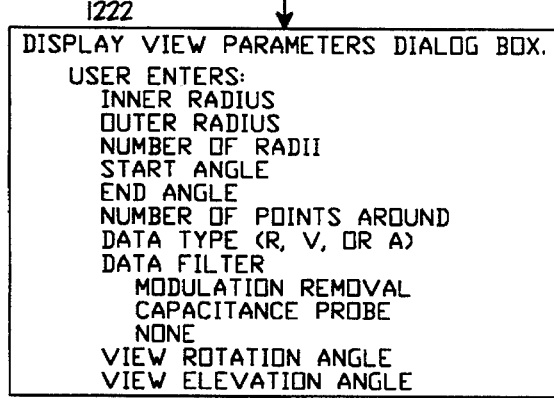
Figures 2, 7B:
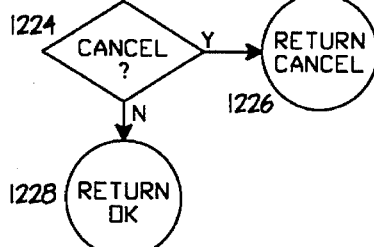
Figure 7D:
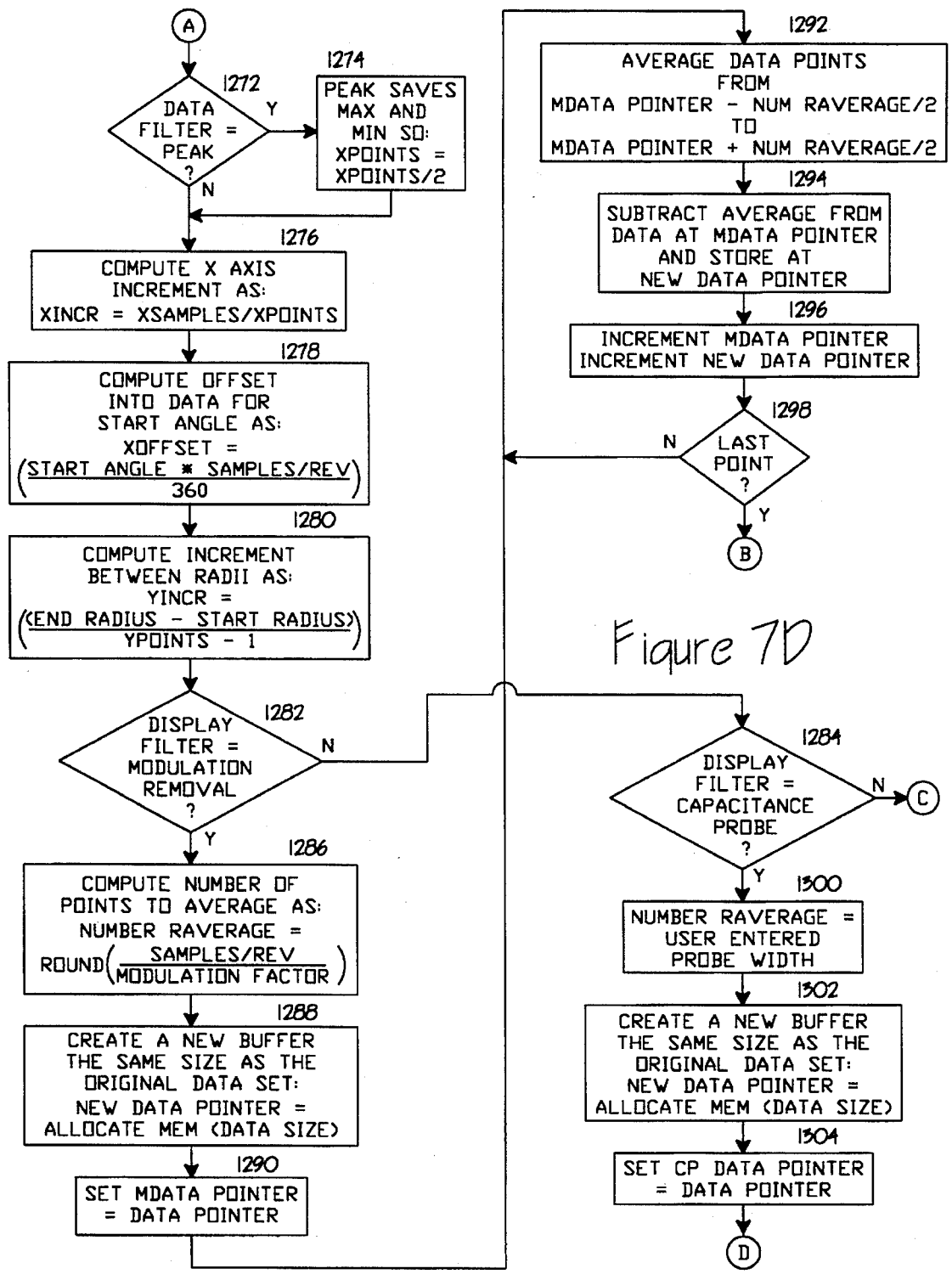

The "View Data Parameters" function, illustrated in FIG. 7B-1, permits the user to select the parameters to be view, and begins at step 1221. A dialogue box is then displayed at step 1222 showing the View Parameters, and the user enters the parameters they desire to have displayed. In addition, the user can cancel, so that a "cancel" check must be made at step 1224. If the user cancels, a cancel return issues at step 1226; if the user completes selection of the view parameters without canceling, a normal return issues at step 1228.

The "Format Data—3-D Plot" function is illustrated in FIG. 7B-2 and permits the display of acquired data in a graphical format. The function begins at step 1230 and continues at step 1232 by issuing a call to a "Scale Data" function (discussed below beginning with FIG. 7C). A check is then made at step 1234 to determine whether a polar plot is called for. If so, at step 1236 a display list is built with scaled data for a 3-D polar plot. In the presently preferred embodiment the plot is displayed in wireframe, but other display approaches may be used in other embodiments.

If a polar plot is not selected at step 1234, a display list is built with scaled data for a 3-D rectangular wireframe plot. In the presently preferred embodiment, hidden line removal is also used, although hidden line removal may not be required in all instances.

Upon completion of the display list build, the function advances to step 1240, where a "paint" message is sent to the display window to cause the display list to be painted to the screen. The process then returns at step 1242.

Finally, for the data to be displayed, it must be scaled to a usable size. This is the purpose of the "Scale Data" function illustrated in flow diagram form in FIGS. 7C–7F. The process begins at step 1250, and continues at step 1252 by checking to see whether a runout plot is requested. If so, the function branches to step 1254 and the data pointer is set to the address of the runout data. In addition, the value of the scale factor is set to runout scale.

If a runout plot is not requested, a negative response at step 1252 advances the function to step 1256, where a check is made to see if a velocity plot has been requested. If so, the function branches to set the data pointer equal to the address of the velocity data, and the scale factor is set to velocity scale. If a velocity plot is not requested, the function advances to step 1260, where a check is made to see whether an acceleration plot has been requested. If so, the function branches to step 1262, where the data pointer is set to the address of the acceleration data, and the scale factor is set to the value of the acceleration scale variable. If a negative response is received at all of steps 1252, 1256 and 1260, the function simply returns at step 1264.

If a runout, velocity or acceleration plot has been requested, however, one of steps 1254, 1258 or 1262 will execute, and following that execution the function will advance to step 1266. At step 1266 the RVA header is copied into the local data area to be used by the plotting and printing functions, followed at step 1268 by computing the index into the data buffer using a start angle and a radius. The information is then added to the data pointer, and the function advances to step 1270, where a computation is made of the number of "x points" (where "x" refers the movement in the "x" direction, or around the disk) or samples in the data buffer between the start and end angles. The function then advances to step 1272, shown in FIG. 7D, where a check is made to see whether the data filter value equals a peak value. If the value is a peak, the maximum and minimum values are saved at step 1274, and the value of XPOINTS is set to XPOINTS/2. If the value was not a peak, or after recalculating the value of XPOINT, the functions advances to step 1276, where the X axis increment is computed, as

XINCR=XSAMPLES/XPOINTS.

The function then advances to step 1278 where the offset is computed into the data for the start angle, as

XOFFSET=[START ANGLE*SAMPLES/REV]/360.

Then, at step 1280, the increment between radii is computed as

YINCR=(END RADIUS—START RADIUS)/YPOINTS −1.

At step 1282 a check is made to determine whether the display filter is set for modulation removal. If not, the function branches to step 1284, where a check is made to see if the display filter is set to emulate a capacitance probe. The emulation of a capacitance probe is discussed in greater detail hereinafter. If the display filter is not set to emulate a capacitance probe, the function branches at point (C) to FIG. 7E, discussed hereinafter.

If the check at step 1282 shows that the display filter is set for modulation removal, the function advances to step 1286 and the number of points to average is computed by setting the variable RAVERAGE to the rounded off value of the number of samples/revolution divided by the modulation factor. The function then advances to step 1288 where a new buffer is created the same size as the original data set, by setting the new data pointer to allocate memory equal to the data size. At step 1290 the function continues by setting the MDATA pointer equal to the data pointer, followed at step 1292 by averaging the data points from (MDATA pointer— Num RAVERAGE/2) to (MDATA pointer +Num RAVERAGE/2).

At step 1294 the average is subtracted from the data at MDATA pointer, and stored at the new data pointer, followed at step 1296 by incrementing the MDATA pointer and the new data pointer. A check is then made at step 1298 to see if the last point has been processed and, if not, the function loops to the beginning of step 1292. If so, the function jumps to point B shown on FIG. 7E.

Given the foregoing discussion, it will be appreciated by those skilled in the art that the purpose of modulation removal is to permit the examination of small, localized runout variations in the presence of large, or global, runout variations. In the context of rigid disks and drives, the user is allowed to remove the "once around" and "twice around" modulation, and examine the remaining runout. This permits the user to examine micro-waviness of approximately 5 times or greater modulation, measurement of bump and stripe disks used for glide calibration, and location and measurement of surface defects such as pits and asperities.

While the foregoing implementation of modulation removal has been done in software, which is presently believed to offer certain advantages, the result could also be realized in hardware. To achieve modulation removal in either hardware or software, a smoothed data set must be generated from a raw data set by using a "running" or "rolling" average. The smoothed data is then subtracted from the raw data and the resultant data highlights the minor surface irregularities. A cut-off threshold, or wavelength, and hence the lower frequency component displayed, is dependent on the degree of smoothing, and is user selectable to permit optimization for particular applications.

The steps for generating a display with modulation removed are, in general terms, to collect a data set of N individual data samples; input the smoothing required and select the number of points to be used in the running average based on the degree of smoothing and the number of available data points; force the number of points in the running average to an odd number, to eliminate phase shift effects; calculate the individual data points for the smoothed curve, while allowing the beginning and end points to wrap around to ensure that the averaging is done with the same number of raw data points; subtract the smoothed data points from the corresponding raw data points; and, examine the result.

If, however, the display filter was set for a capacitance probe, as determined by the checks at step 1282 and 1284, the function advances to step 1300, where the value of RAVERAGE is set equal to a user entered probe width. Capacitance probe emulation in software is required in some instances because certain prior art devices used capacitance probes and some users prefer to evaluate the data by correlating it to older measurement techniques. Capacitance probe emulation can be accomplished, in general, by averaging a group of data points acquired with the present invention.

At step 1302, a new buffer is created the same size as the original data set, in the same manner as in step 1288, followed at step 1304 by setting the CP data pointer equal to the value of the data pointer. The process then continues in FIG. 7E at point D, step 1306, by average the data points from (CP data pointer−Number of RAVERAGE/2) to (CP Data Pointer +Number of RAVERAGE/2), storing the average at the new data pointer in step 1308 and incrementing the CP data pointer and new data pointer at step 1310. A "last data point" check is then made at step 1312 and, if not, the function loops to the beginning of step 1306.

If so, or if the display filter was set for modulation removal as checked at step 1282 and the last point has been reached as determined by step 1298 (point B), the function advances to step 1314 by setting the data pointer equal to the value of the new data pointer. After setting the new value of the data pointer in step 1314, or if the display filter was not set for a capacitance probe as checked at step 1284 (point C), the function advances to step 1316 where a COL ("Column") data pointer is set equal to the value of the data pointer plus XOFFSET.

The function then advances to step 1318, where a check is made to see whether the data filter has been set to "skip". If so, the function branches to step 1320, where the value of the new data is set equal to the data at the COL data pointer. If, however, the check at step 1318 returns a negative, a check is made at step 1322 to see whether the data filter is set to "average". If so, the function branches to step 1324, where the value of the new data is set to the average of the data at COL data pointer through COL data pointer +XINCR−1.

If the check at step 1322 returns a negative, the value of the new data is set to the greatest value of the data at COL data pointer through COL data pointer+XINCR−1. The function continues by setting the value of low data equal to the smallest value of the data at COL data pointer through COL data pointer+XINCR−1. A check is then made at step 1330 to determine whether the display units are inches and, if so, a conversion is made at step 1332. If not, or after the conversion is completed, the function advances to step 1338, where the value of low data is stored in the scaled data buffer. The branches from steps 1320 and 1324 then rejoin, and the function continues at point F, in FIG. 7F.

Referring to FIG. 7F, beginning at point F, a check is made at step 1340 to determine whether the display units are inches. If so, a conversion is made at step 1342. After the conversion, or if it is not necessary, the function continues at step 1344 by checking to see whether the new data is larger than the scale factor. If so, at step 1346 the new data is set equal to the scale factor. After the resetting in step 1346, or if it is not necessary, the function continues at step 1348 by checking whether the new data is less than the negative of the scale factor. If so, at step 1350 the new data is set equal to the negative scale factor.

Figure 7E:
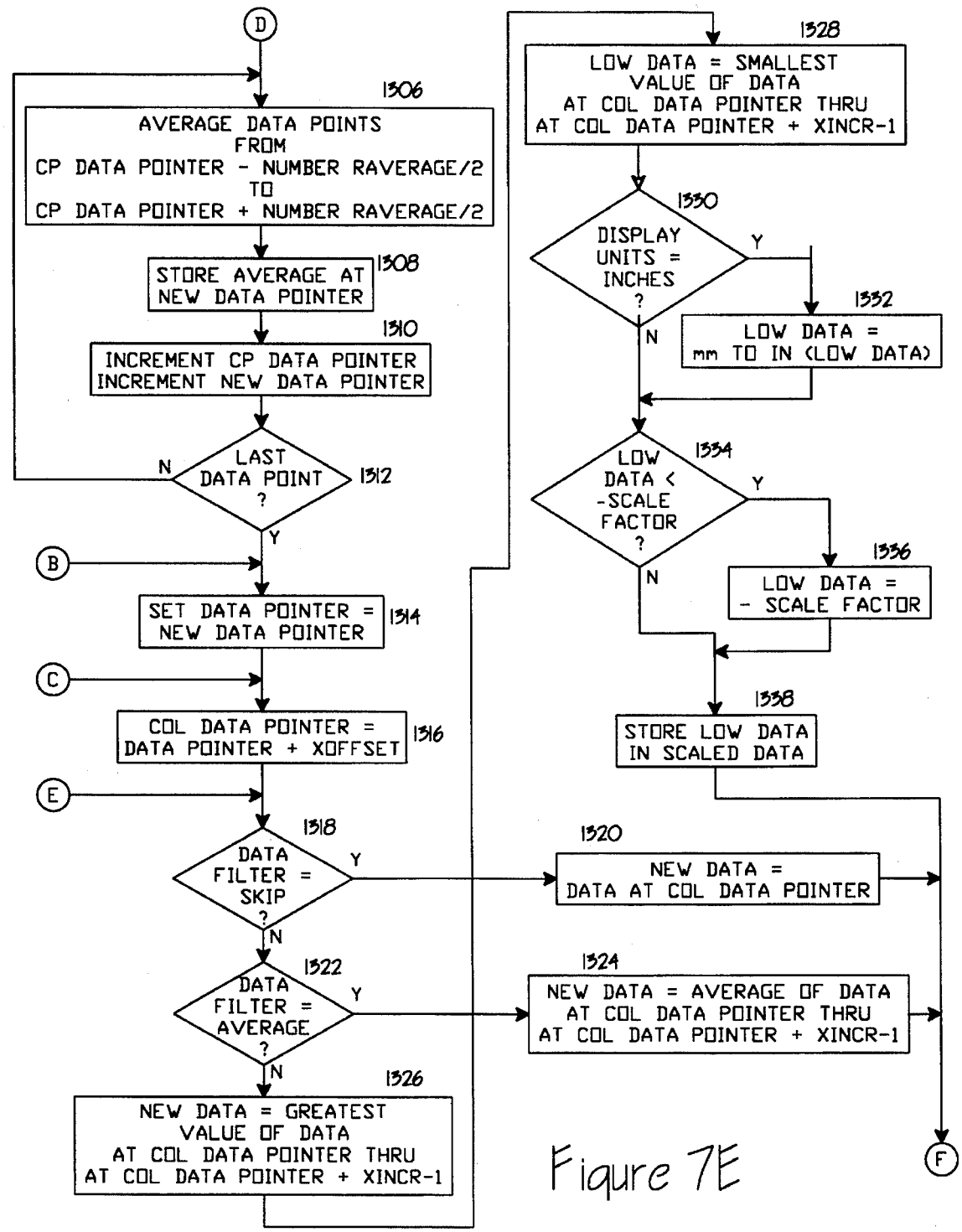
Figure 7F:
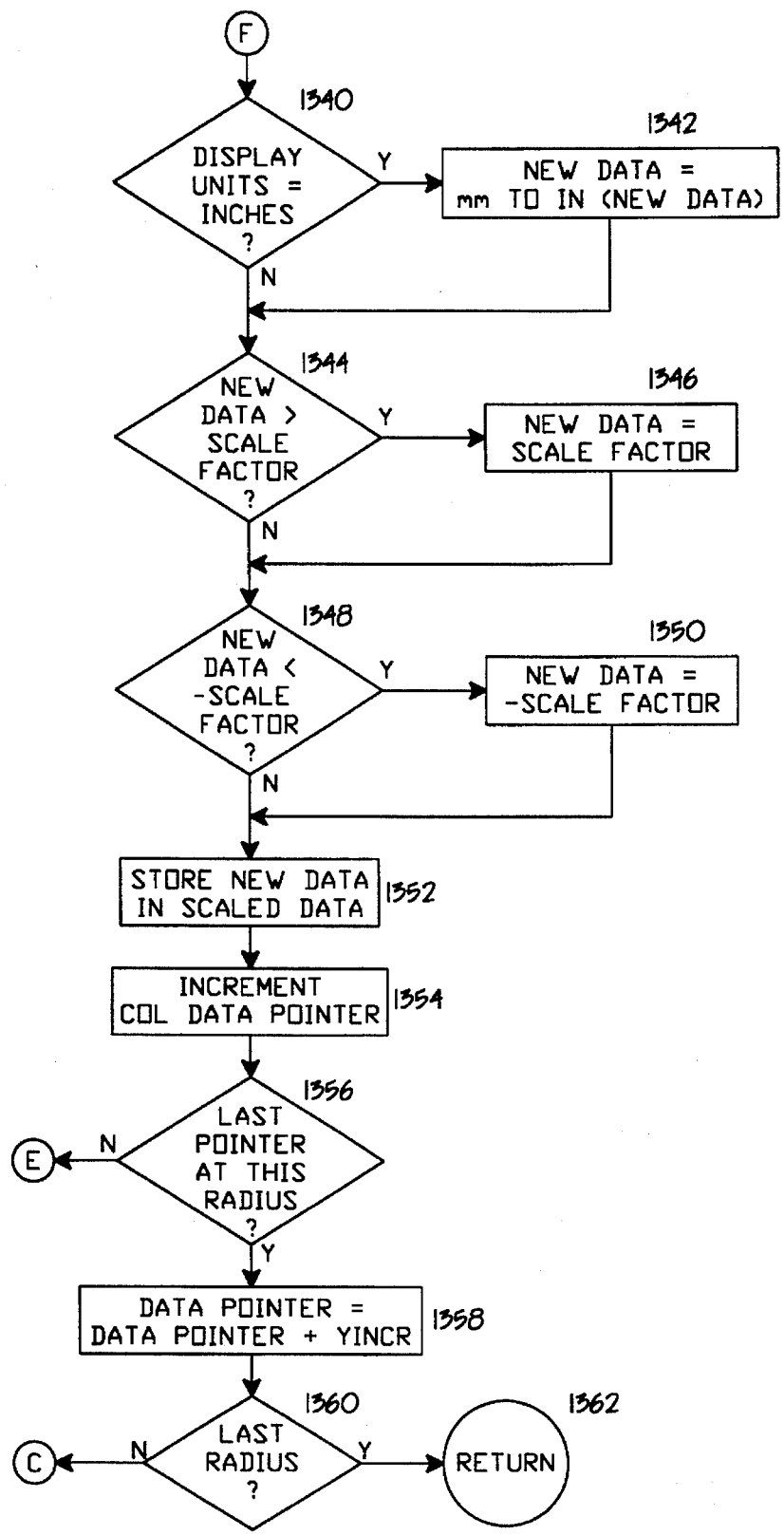

Following the resetting at step 1350, or if it is not necessary, the new data is stored in the scaled data buffer at step 1352, and the COL data pointer is incremented at step 1354. A check is then made at step 1356 to determine if this is the last pointer at this radius. If not, the function loops back to the top of step 1318 (FIG. 7E, point E). If it is, the function advances to step 1358, where the value of the data pointer is set to the prior value of the data pointer plus YINCR. A "last radius" check is then made at step 1360, and if more radii remain to be process the function loops to step 1316 (FIG. 7E, point C). If there are no more radii to be processed, the system exits with a normal return at step 1362.

Having fully described a preferred embodiment of the invention and various alternatives, those skilled in the art will recognize, given the teachings herein, that numerous alternatives and equivalents exist which do not depart from the invention. In particular, while the exemplary embodiment is particularly suited to use with media for fixed disks, the methods and systems discussed herein are suitable for use with many types of objects where examination of surface deformities is desired and the object can be tested while rotating. It is therefore intended that the invention not be limited by the foregoing description, but only by the appended claims.

What is claimed is:

1. A tester for examining surface variations of an object, the tester having means for holding and rotating the object to be tested, the object to be tested having an upper surface, means for illuminating a portion of the upper surface of the object be tested with a highly collimated beam and receiving back a portion of the beam as reflected by the upper surface of the object to be tested, and means for determining a phase difference between the illuminating beam and the reflected portion of the beam and determining therefrom an indicia of instantaneous velocity of a point on the upper surface of the object to be tested toward or from the means for illuminating.

2. The tester of claim 1 further including means for integrating and differentiating the velocity to determine runout and acceleration, respectively.

3. A Runout, Velocity, acceleration tester for examining surface variations of a rotating object comprising means for holding and rotating an object under test, the object under test having an upper surface, means for illuminating at least a portion of the upper surface of the object with a highly collimated beam, means for receiving at least a portion of the beam reflected from the upper surface of the object, means for determining the instantaneous velocity of the illuminated portion of the upper surface of the object toward or from the means for illuminating by measuring and processing the phase difference between the illuminating beam and the reflected portion, means for integrating the velocity to determine runout, and means for differentiating the velocity to determine acceleration.

4. A method for examining surface variations of a rotating object, the method comprising holding and rotating an object under test, the object under test having an upper surface, illuminating at least a portion of the upper surface of the object with a highly collimated beam from a beam source, receiving at least a portion of the beam reflected from the upper surface of the object, determining the instantaneous velocity of the illuminated portion of the upper surface of the object toward or from the beam source by measuring and processing the phase difference between the illuminating beam and the reflected portion, integrating the velocity to determine runout, differentiating the velocity to determine acceleration, correcting for offset errors comprising the further steps of measuring the velocity as the object rotates past an index, measuring a plurality of velocities at a predetermined radius, measuring a second velocity as the object again rotates past an index, integrating the velocities to achieve a value associated with each velocity representative of runout, determining an average of the runout values, dividing the average by the number of measured velocities to yield a correction factor, subtracting from the first runout value the correction factor multiplied by one, subtracting from the second runout value the correction factor multiplied by two, and subtracting from the $n^{th}$ runout value the correction factor multiplied by n.

5. A tester for examining surface variations of an object to be tested, the tester having means for holding and rotating the object to be tested, means for illuminating a portion of the object to be tested with a highly collimated beam and receiving back a portion of the beam as reflected by the object to be tested, means for determining a phase difference between the illuminating beam and the reflected portion of the beam and determining therefrom an indicia of instantaneous rate of change of a distance between the object to be tested and the means for illuminating.

6. A Runout, Velocity, Acceleration tester for examining surface variations of a rotating object comprising means for holding and rotating an object under test, means for illuminating at least a portion of the object with a highly collimated beam, means for receiving at least a portion of the beam reflected from the object, means for determining the instantaneous rate of change of a distance between the illuminated portion of the object and the means for illuminating by measuring and processing the phase difference between the illuminating beam and the reflected portion, means for integrating the instantaneous rate of change to determine runout, and means for differentiating the instantaneous rate of change to determine acceleration.

* * * * *